United States Patent
Yanagibashi et al.

(10) Patent No.: US 11,042,985 B2
(45) Date of Patent: Jun. 22, 2021

(54) ELECTRONIC APPARATUS, CONTROL METHOD, AND NON-TRANSITORY COMPUTER READABLE MEDIUM FOR GENERATING A DISPLAY IMAGE

(71) Applicant: CANON KABUSHIKI KAISHA, Tokyo (JP)

(72) Inventors: Ken Yanagibashi, Kawasaki (JP); Hirofumi Urabe, Tokyo (JP); Takushi Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/662,416

(22) Filed: Oct. 24, 2019

(65) Prior Publication Data
US 2020/0134826 A1  Apr. 30, 2020

(30) Foreign Application Priority Data

Oct. 30, 2018  (JP) .............................. JP2018-203839

(51) Int. Cl.
| | |
|---|---|
| *G06T 7/11* | (2017.01) |
| *H04N 7/01* | (2006.01) |
| *G06T 5/00* | (2006.01) |
| *G06T 7/136* | (2017.01) |
| *G06T 5/50* | (2006.01) |
| *H04N 7/18* | (2006.01) |

(52) U.S. Cl.
CPC ................ *G06T 7/11* (2017.01); *G06T 5/001* (2013.01); *G06T 5/50* (2013.01); *G06T 7/136* (2017.01); *H04N 7/0127* (2013.01); *H04N 7/183* (2013.01)

(58) Field of Classification Search
CPC . G06T 7/11; G06T 5/001; G06T 7/136; G06T 5/50; G06T 3/4053; H04N 7/0127; H04N 7/183; H04N 7/0152; G09G 5/00
See application file for complete search history.

(56) References Cited

U.S. PATENT DOCUMENTS

| | | | |
|---|---|---|---|
| 2015/0130809 A1* | 5/2015 | Tagami ................ | G02B 21/367 345/428 |
| 2018/0295319 A1* | 10/2018 | Yamashita ............ | H04L 49/352 |
| 2019/0251651 A1* | 8/2019 | Chang .................. | G09G 3/2096 |

FOREIGN PATENT DOCUMENTS

JP     2018-093305 A     6/2018

* cited by examiner

*Primary Examiner* — Padma Haliyur
(74) *Attorney, Agent, or Firm* — Cowan, Liebowitz & Latman, P.C.

(57) ABSTRACT

An electronic apparatus which generates a display image, includes: terminals; and at least one processor and/or at least one circuit to perform the operations of the following units: obtaining unit configured to obtain second images each having a second number of pixels from the terminals, wherein the second images form a first image having a first number of pixels, setting unit configured to set a region of the first image corresponding to the display image based on user input, and generating unit configured to generate the display image on the basis of one of the second images in a case where the number of pixels in the region is greater than a threshold.

14 Claims, 25 Drawing Sheets

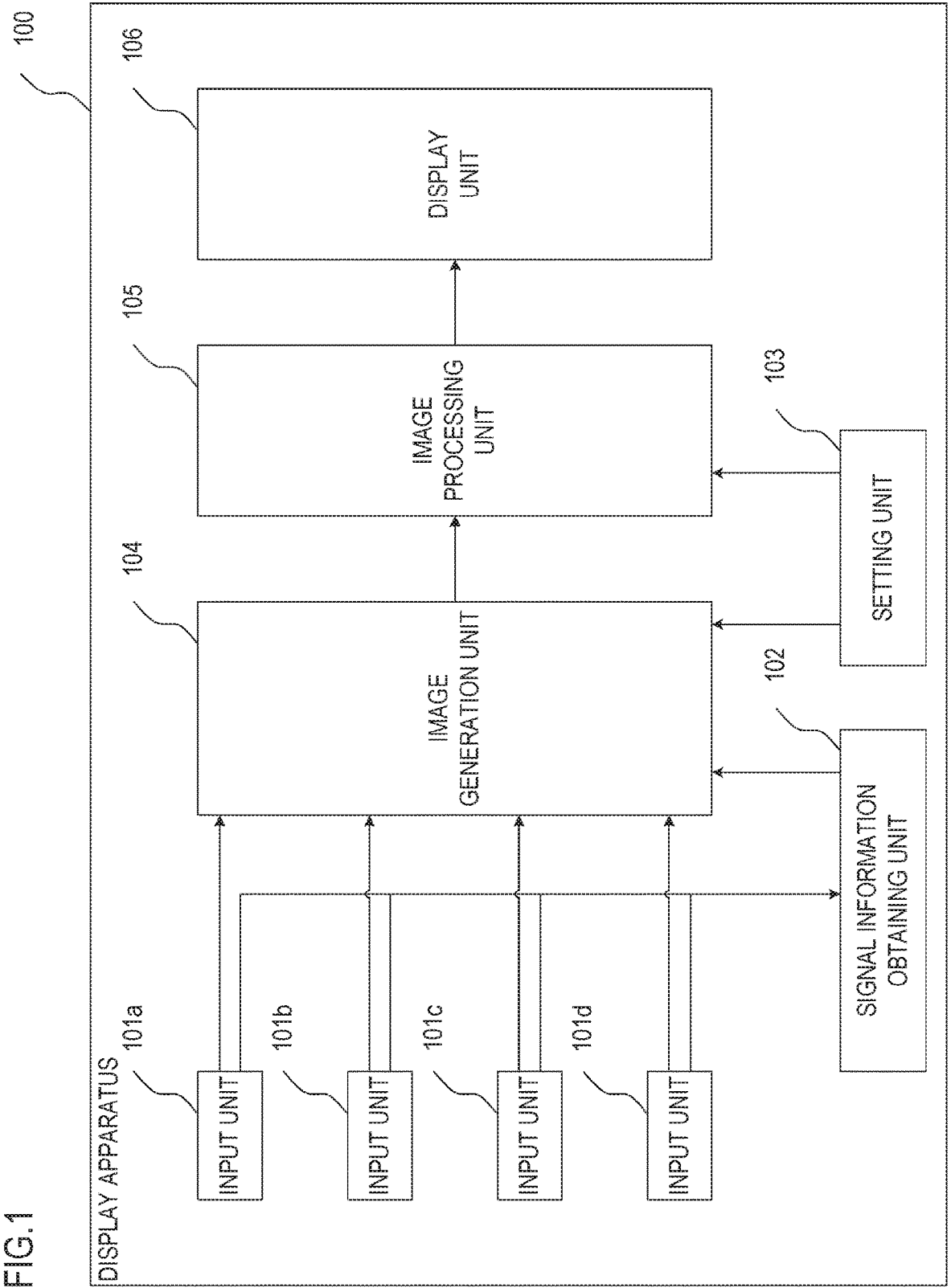

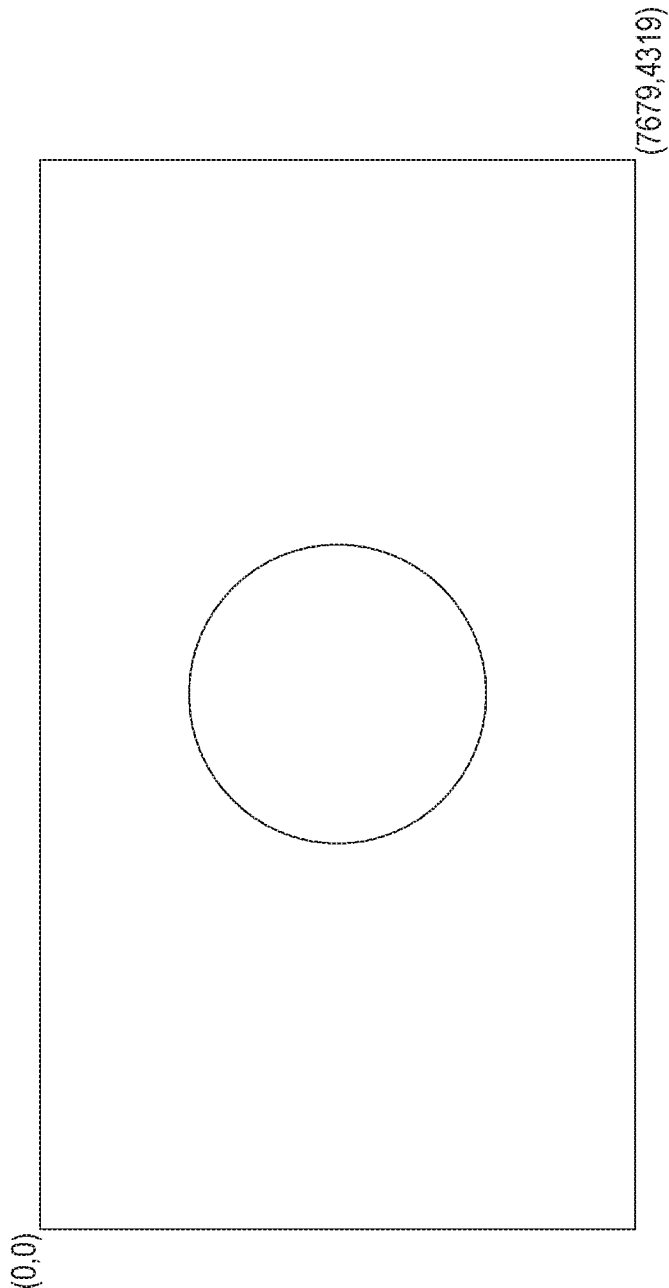

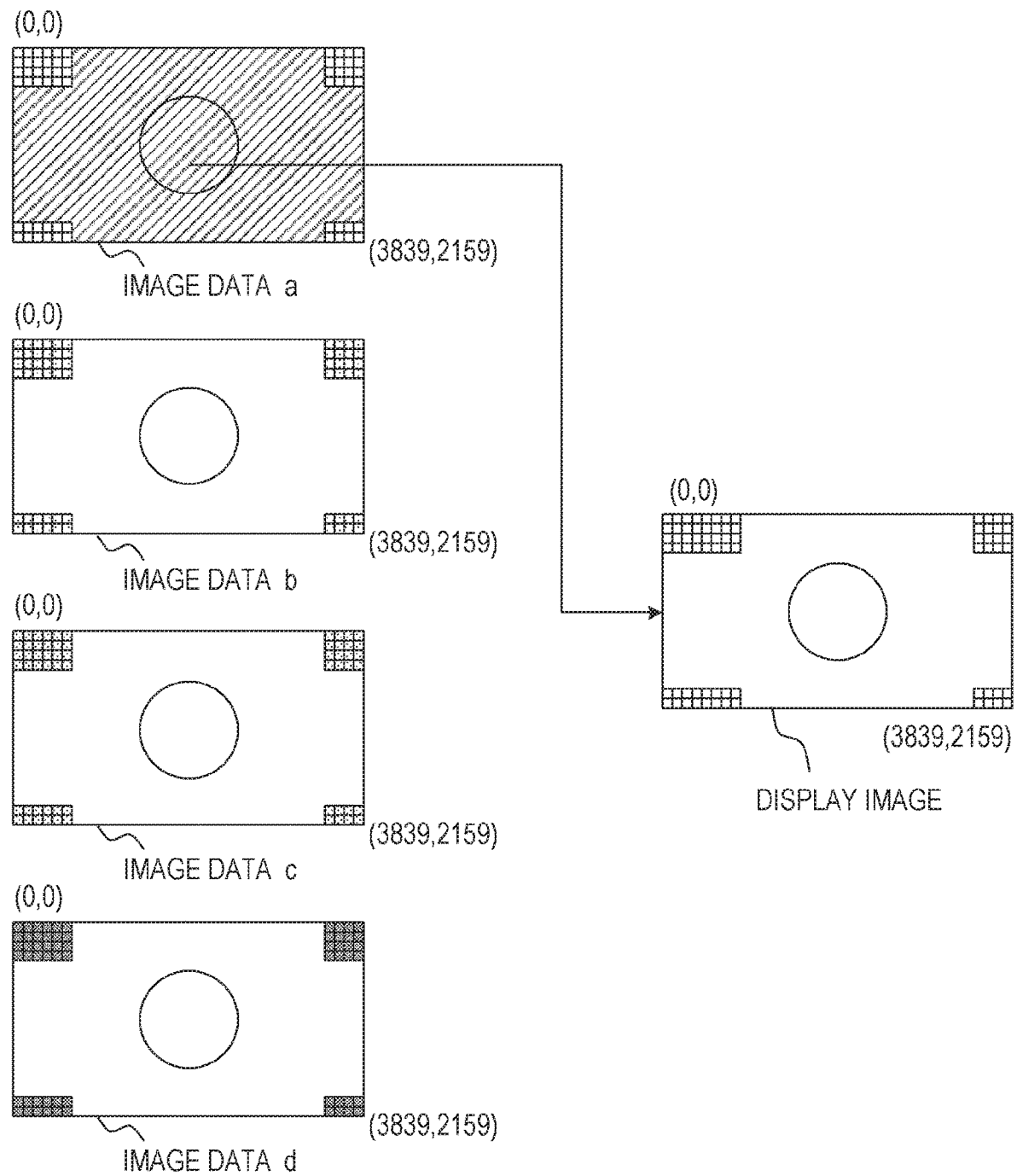

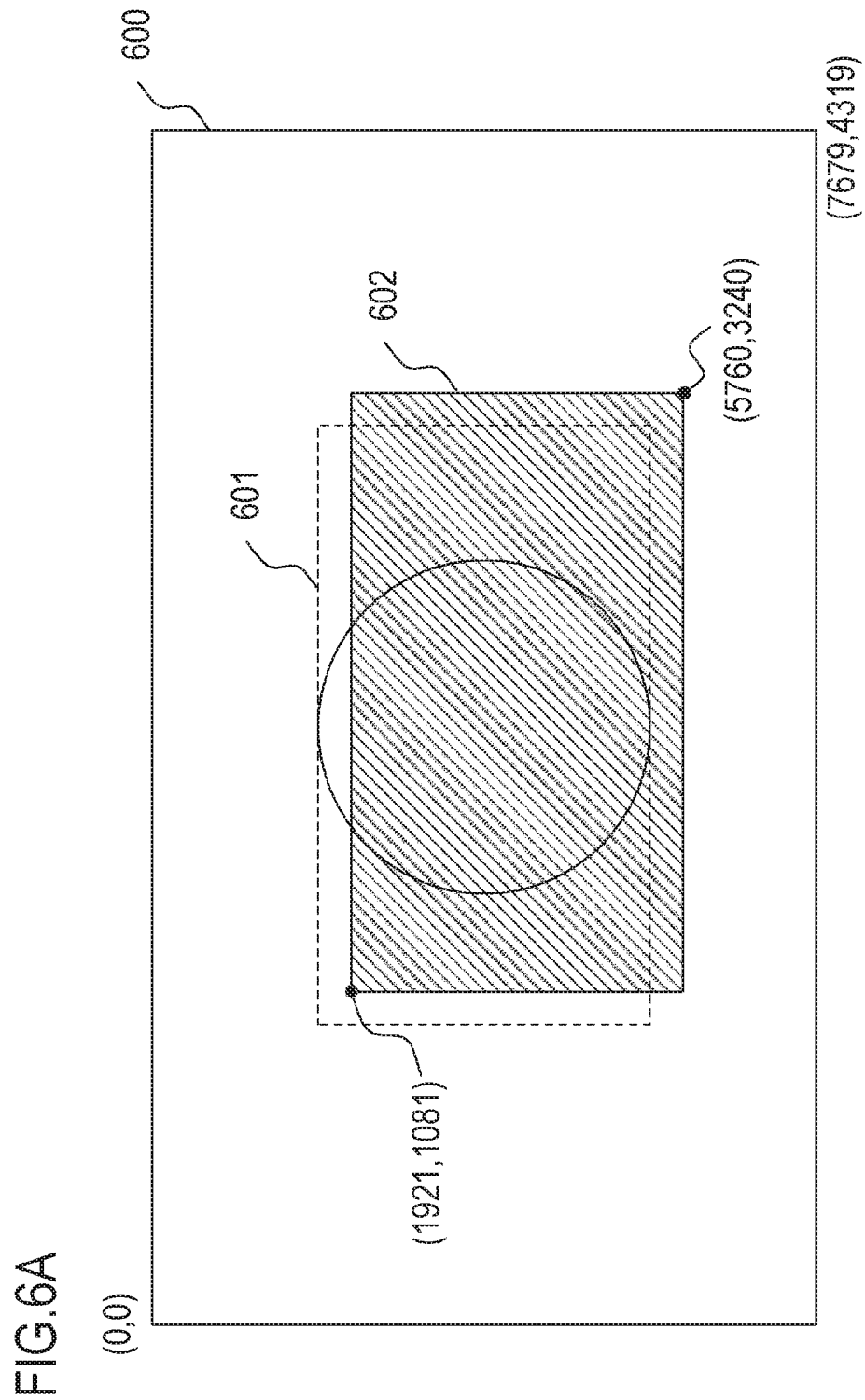

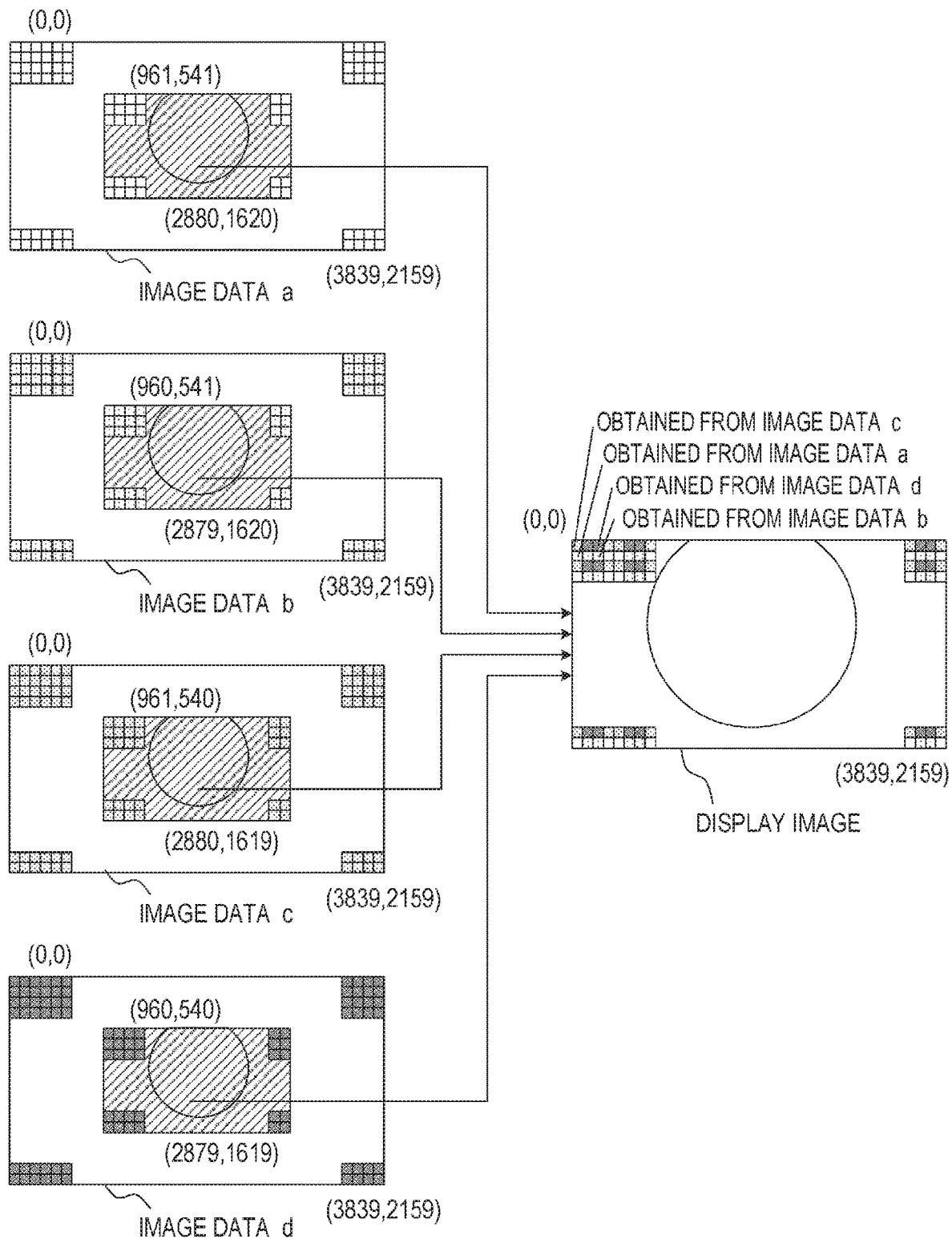

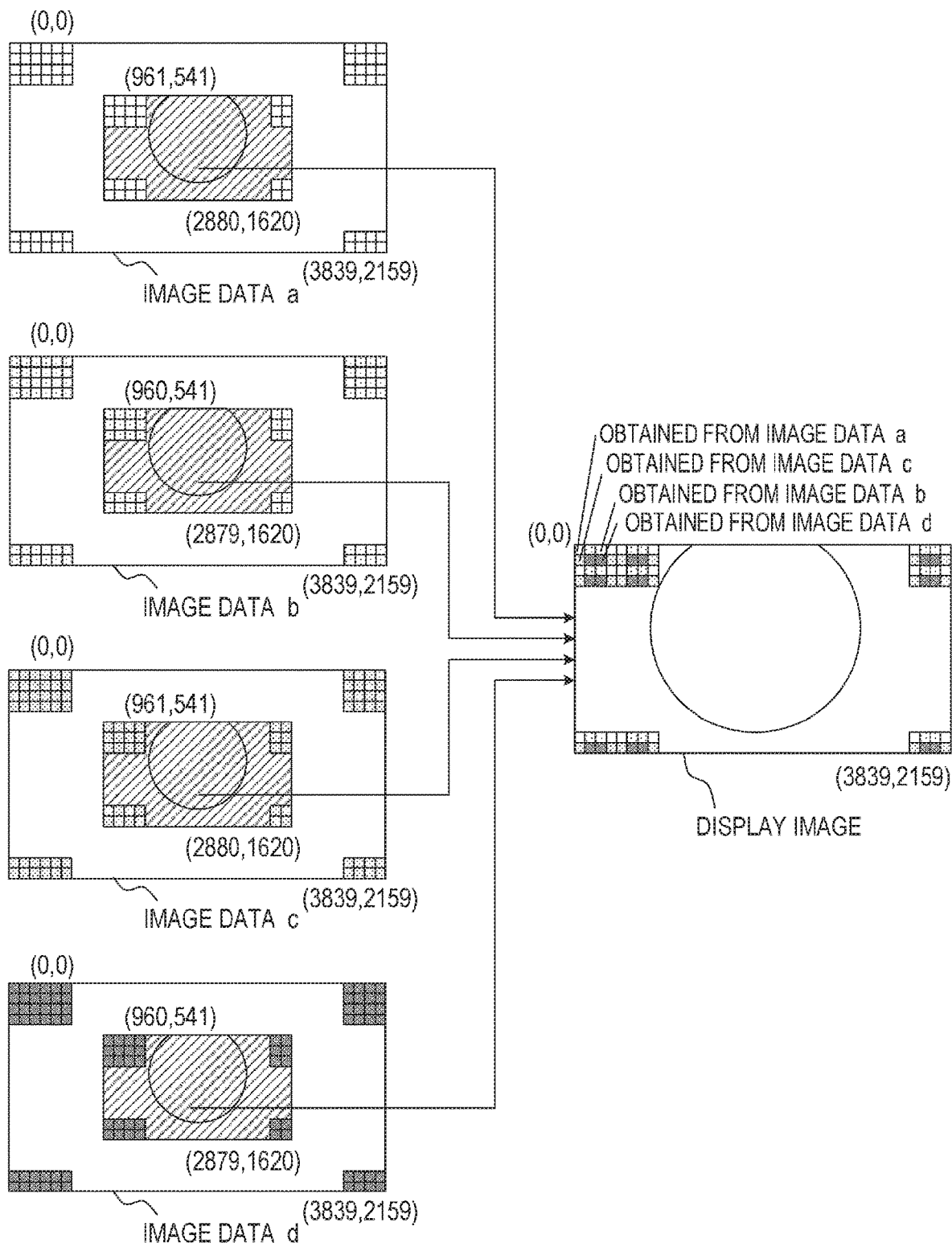

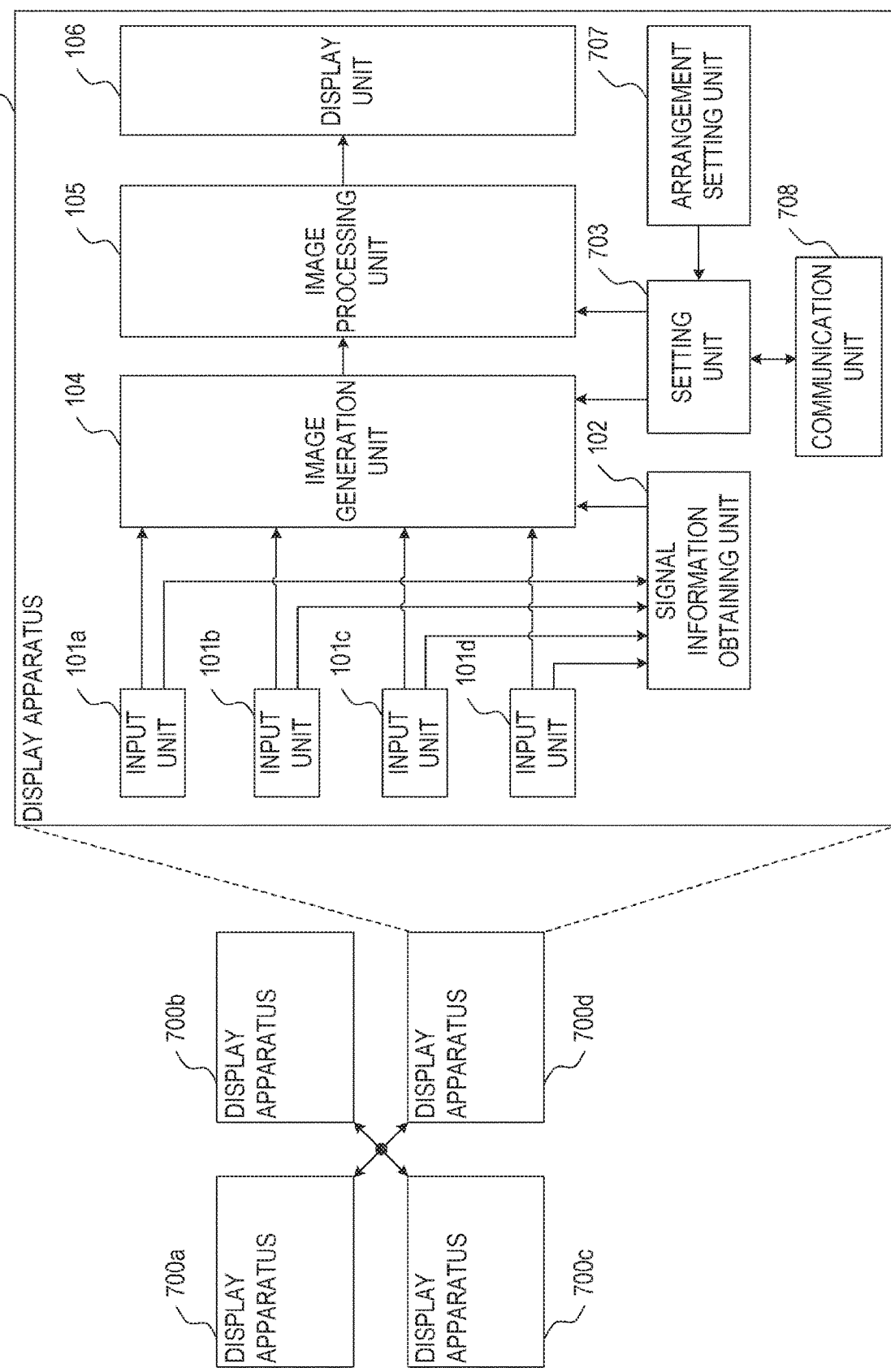

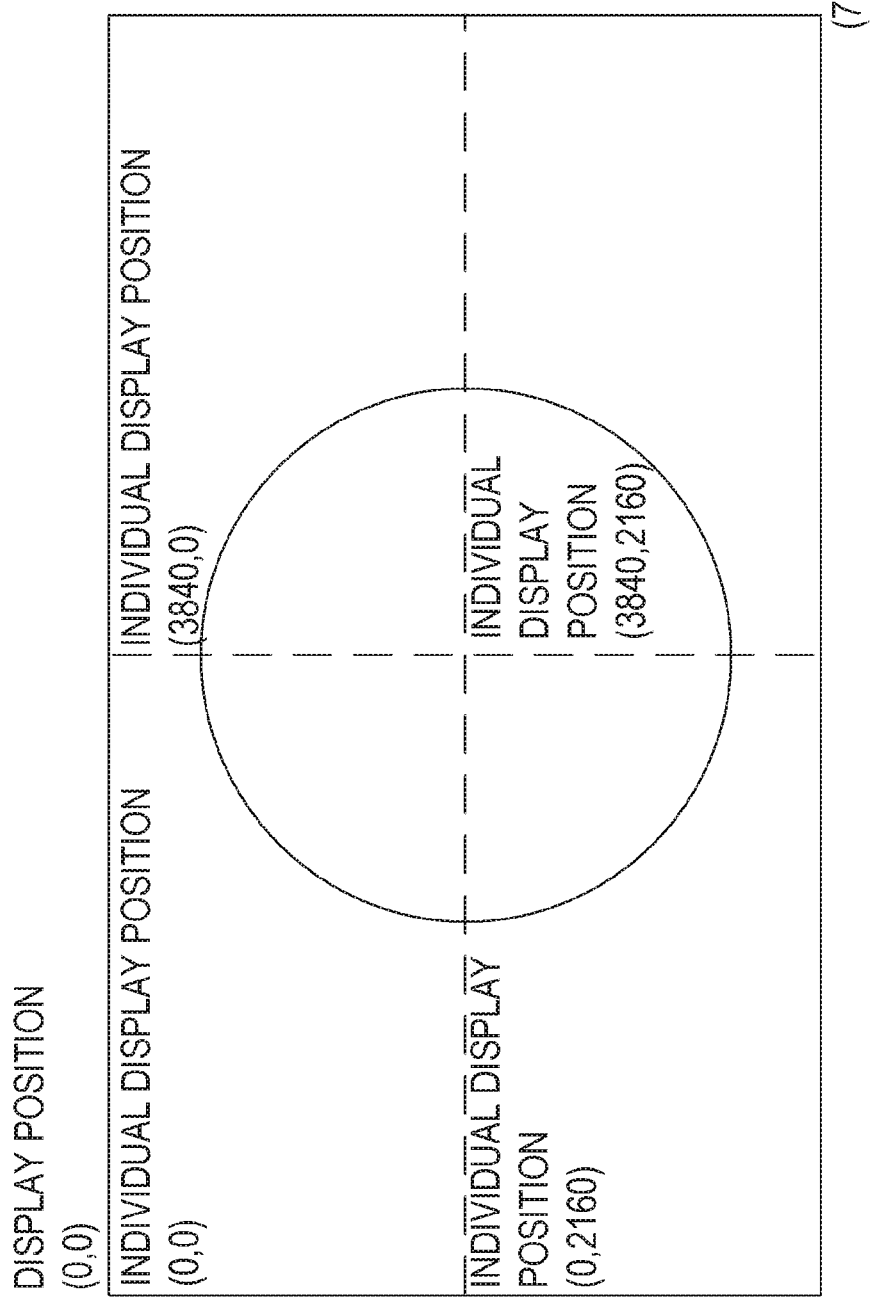

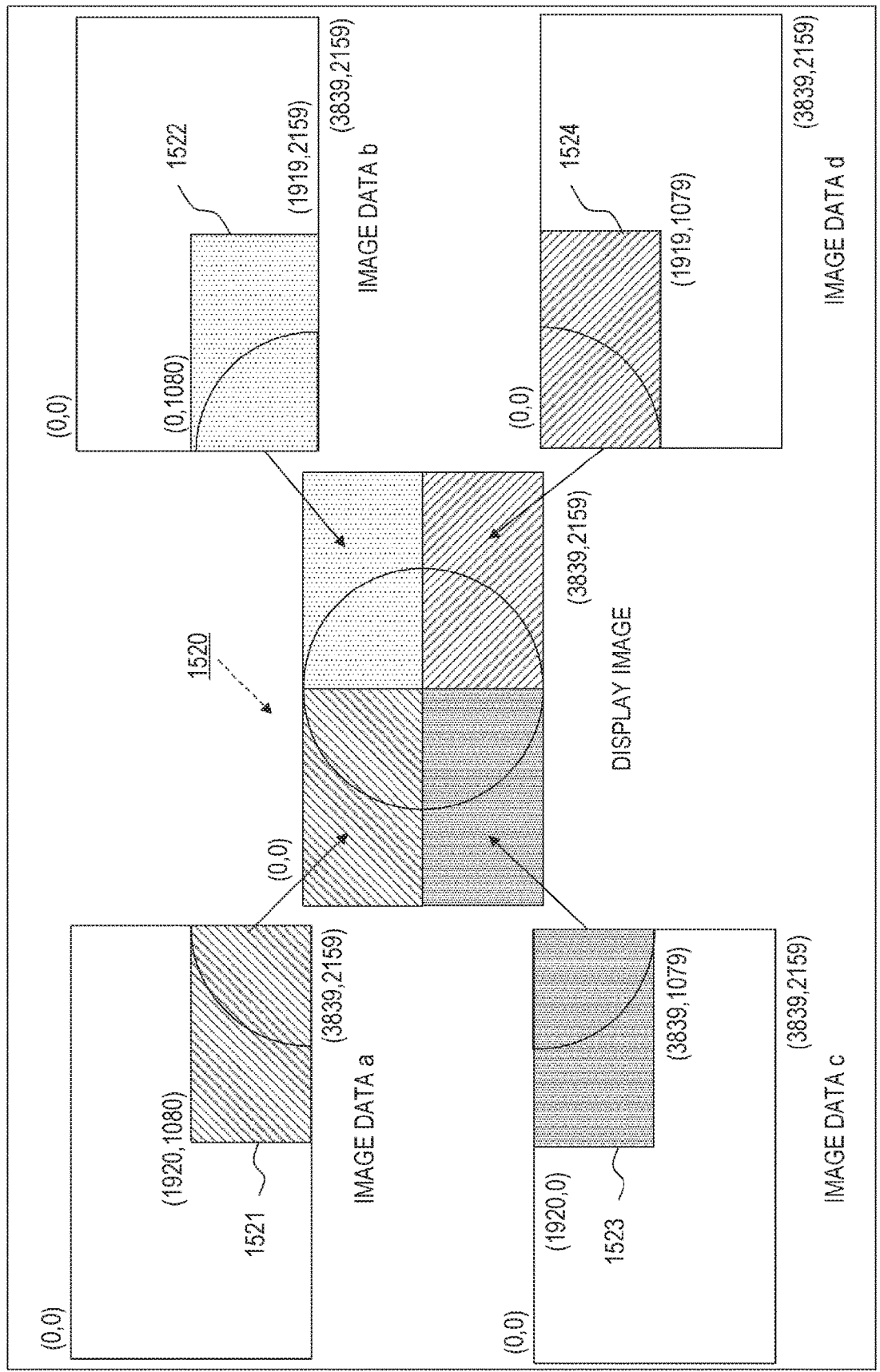

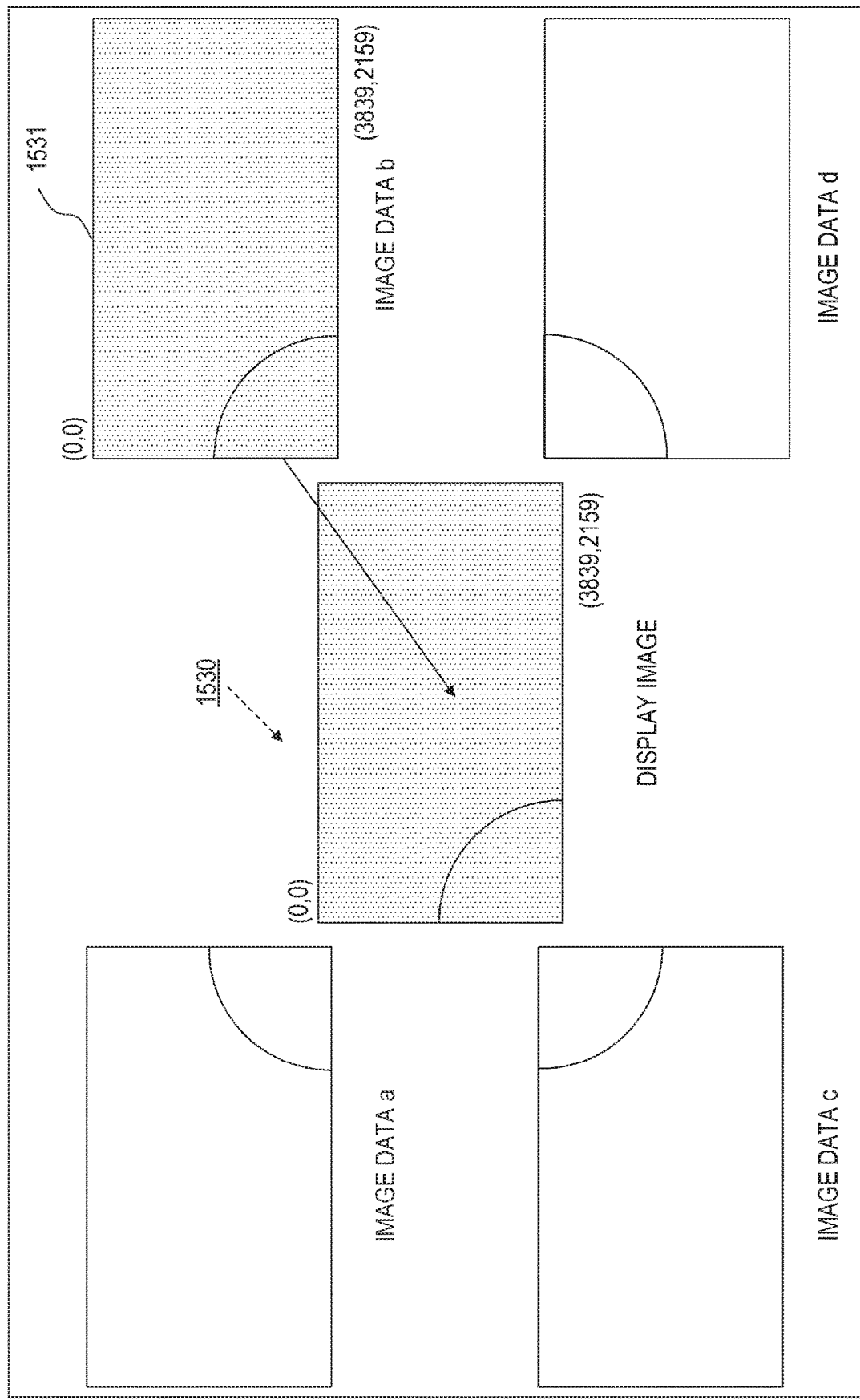

ELECTRONIC APPARATUS, CONTROL METHOD, AND NON-TRANSITORY COMPUTER READABLE MEDIUM FOR GENERATING A DISPLAY IMAGE

BACKGROUND OF THE INVENTION

Field of the Invention

The present invention relates to an electronic apparatus, a control method for an electronic apparatus, and a non-transitory computer readable medium.

Description of the Related Art

Imaging apparatuses capable of capturing high-resolution images (such as 8K images) have been developed in recent years. For example as a standard for transmitting such high-resolution images to a display apparatus or the like, Quad-Link 12G-SDI is defined in a standard related to video technology, SMPTE ST 2082. In Quad-Link 12G-SDI, 4K images obtained by dividing an 8K image into four are transmitted by four terminals (cables).

A display apparatus which receives such a high-resolution image may not be adapted to process high-resolution images in some cases (such as the case of a 4K display apparatus). In this case, one of the four terminals is selected and an image (such as a 4K image) transmitted by the terminal is displayed.

According to a known technique, a terminal is selected among a plurality of terminals depending on available processing or displaying capability, and among the signals transmitted by the terminals, the signal from the selected terminal is processed. For example, Japanese Patent Application Publication No. 2018-93305 discloses a technique for selecting a terminal depending on a frame rate which allows a high-frame rate image transferred in a divided manner to be displayed.

SUMMARY OF THE INVENTION

The present invention in its first aspect provides an electronic apparatus which generates a display image, comprising: terminals; and at least one processor and/or at least one circuit to perform the operations of the following units: obtaining unit configured to obtain second images each having a second number of pixels from the terminals, wherein the second images form a first image having a first number of pixels, setting unit configured to set a region of the first image corresponding to the display image based on user input, and generating unit configured to generate the display image on the basis of one of the second images in a case where the number of pixels in the region is greater than a threshold.

The present invention in its second aspect provides a control method for an electronic apparatus which generates a display image wherein the electronic apparatus including terminals, the control method comprising: obtaining a second images each having a second number of pixels from the terminals, wherein the second images form a first image having a first number of pixels, setting a region of the first image corresponding to the display image based on user input, and generating the display image on the basis of one of the second images in a case where the number of pixels in the region is greater than a threshold.

The present invention in its third aspect provides a non-transitory computer readable medium that stores a program, wherein the program causes a computer to execute the above method.

According to the present invention, a degradation in the picture quality of an enlarged display image can be reduced in a display apparatus which cannot process a high-resolution image transferred to terminals in a divided manner.

Further features of the present invention will become apparent from the following description of exemplary embodiments with reference to the attached drawings.

BRIEF DESCRIPTION OF THE DRAWINGS

FIG. 1 is a functional block diagram of a display apparatus according to a first embodiment of the present invention, FIG. 2A is a view for illustrating an exemplary image generating method according to the first embodiment.

FIG. 2B is a view for illustrating the exemplary image generating method according to the first embodiment.

FIG. 6A is a view for illustrating an exemplary image generating method according to the second embodiment.

FIG. 69 is a view for illustrating the exemplary image generating method according to the second embodiment.

FIG. 6D is a view for illustrating the exemplary image generating method according to the second embodiment.

FIG. 7 is a functional block diagram of a display apparatus according to a third embodiment of the present invention.

FIG. 8 is a view of exemplary image display according to the third embodiment.

FIG. 15B is a view for illustrating an exemplary image generating method according to the fifth embodiment.

FIG. 15C is a view for illustrating the exemplary image generating method according to the fifth embodiment.

DESCRIPTION OF THE EMBODIMENTS

Method for Transmitting Image

Figure 17A:
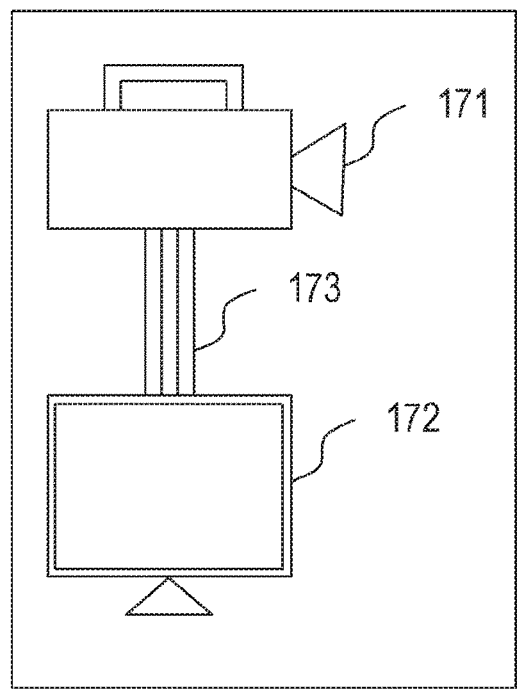
FIGS. 17A to 17C are views for illustrating an image transmitting method according to an embodiment of the present invention.

A general method for transmitting a high-resolution image will be described. FIG. 17A illustrates an imaging apparatus 171 which captures a high-resolution image (including a still picture and a moving picture) and a display apparatus 172. The high-resolution image includes a large number of pixels. The resolution is synonymous with the number of pixels. The imaging apparatus 171 and the display apparatus 172 are connected by four terminals (cables) 173. For example, Quad-Link 12G-SDI is defined in a standard related to video technology, SMPTE ST 2082. In Quad-Link 12G-SDI, four 4K images obtained by dividing an 8K image (an 8K video image) into four can be transmitted by the four terminals (cables).

As a method for dividing a high-resolution image into four on a pixel-basis, the "2SI (2 Sample Interleave)" or the "SQD (Square Division)" is mainly used.

Figure 17B:
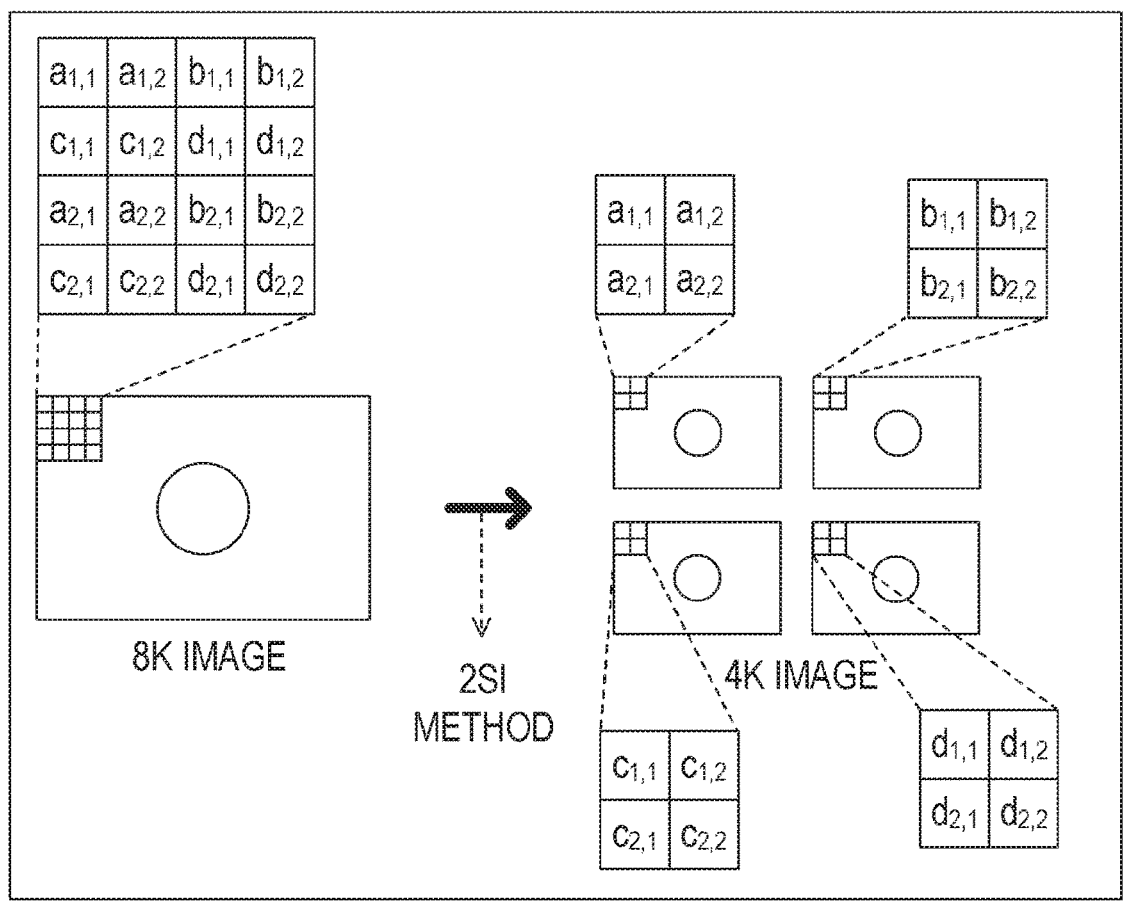
Figure 17C:
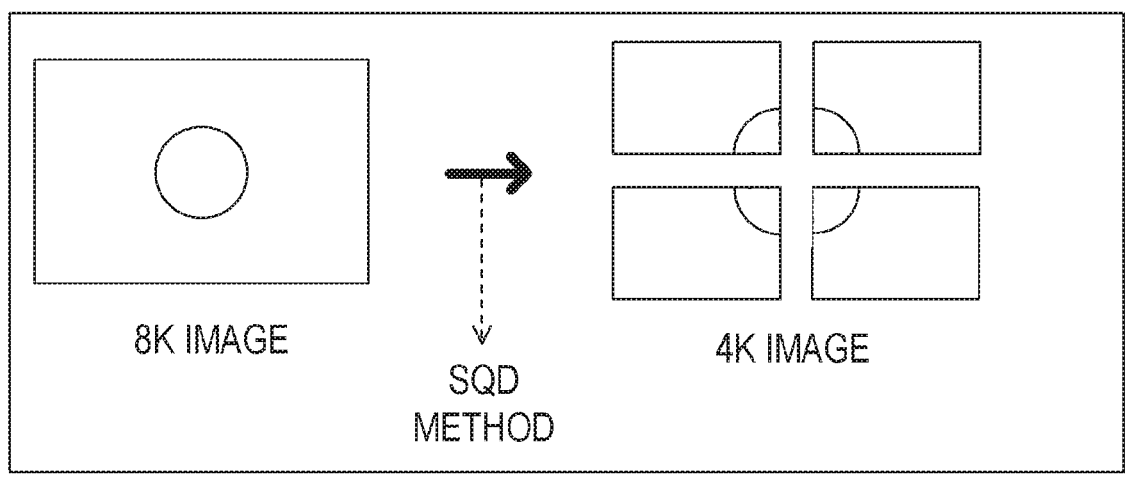

FIG. 17B shows the concept of divisional processing according to the 2SI method. According to the 2SI method, an image is generated by carrying out sampling (thinning) to the original image for every prescribed pixels. More specifically, an image a and an image b are generated by extracting pixels for every two pixels from odd-numbered rows, while an image c and an image d are generated by extracting pixels for every two pixels from even-numbered rows. FIG. 17C shows the concept of divisional processing according to the SQD method. According to the SQD method, images are obtained by equally dividing the original image into four in the vertical and horizontal direction.

According to the 2SI method and the SQD method, a plurality of images which form one original image are generated by division. According to either of the methods, four divisional signals (images a to d) are transmitted through terminals a to d, respectively. Note that according to the SQD method, all the four images a to d must be obtained in order to restore the original image. Meanwhile, according to the 2SI method, the entire original image (though with a low resolution) can be restored by using only one of the images a to d.

First Embodiment

Hereinafter, a display apparatus according to an embodiment of the invention will be described. In the following description, the display apparatus according to the embodiment has a screen resolution of 3840×2160 (4K), and the image size Which can be processed by the memory of the display apparatus is 4K. The original image (a first image) input to the display apparatus is 7680×4320 (8K). Signal transmission according to the embodiment is based on Quad-Link 12G-SDI described above. An image (image data) input to the display apparatus is divided on a pixel-basis according to the 2SI method described above into four images (image data, image signals, or second images), and the images are transmitted through four cables. According to the embodiment, an image is to be used for generating a display image is selected from the four pieces of image data on the basis of a display magnification set by a user. Hereinafter, the overall configuration of the display apparatus according to the embodiment and the content of processing carried out by the apparatus will be sequentially described.

FIG. 1 is a functional block diagram of a display apparatus 100 according to the embodiment. The display apparatus 100 also functions as an image processing device (a computer) including an operation device (a processor), a memory, a storage device, and an input/output device. As the display apparatus 100 executes programs stored in the storage device, the following functions of the display apparatus 100 are provided. Some or all of these functions may be implemented by a specific logic circuit such as an ASIC and an FPGA.

Input units 101a to 101d include terminals a to d, respectively. Input units 101a to 101d obtain a plurality of images (image data) transmitted through the terminals a to d, respectively. The input units 101a to 101d output the received plurality of image data to a signal information obtaining unit 102 and an image generating unit 104 which will be described. Note that in the following description of the embodiment, the standard (kind) of the signals received by the input units is 12G-SDI. The 12G-SDI is a standard related to high-speed transmission achieved by converting images into digital signals, and signals are transmitted using a cable having a transmission speed of 12 Gbps. The standard of signals to be received is not particularly limited, and 3G-SDI signals or 6G-SDI signals may be received.

The signal information obtaining unit 102 obtains signal information on signals (SDI signals) output from the input units 101a to 101d. The signal information obtaining unit 102 also outputs the obtained signal information to the image generating unit 104. The signal information includes the transmission method such as a standard (such as Quad-Link 12G-SDI) of the received signal, the dividing method of the received signal (for example 2SI or SQD) or an image format such as a resolution. The signal information obtaining unit 102 obtains the signal information for example on the basis of the identification information on the received signal or the payload ID.

A setting unit 103 sets a display position and a display magnification for a display image (a 4K image) as an image to be displayed at a display unit 106 (which will be described) in the original image (an 8K image) formed by the image input to the display apparatus 100 based on an instruction received from the user. The user inputs the settings for the display position and the display magnification for example by operating buttons (not shown). The setting unit 103 outputs the input setting values to the image generating unit 104 and the image processing unit 105. Note that the setting unit 103 may be understood as an accepting unit which accepts various settings by the user. Note that the method for setting the display position and the display magnification is not particularly limited and the values may be set for example in response to user operation on a touch panel (not shown) provided at the display unit 106. The setting unit 103 may be understood as a unit which sets a region (a display region) of the original image corresponding to an image to be displayed at the display unit 106 in response to user input.

The display position (position) is the position of a region of the original image to be displayed at the display unit 106. According to the embodiment, when an upper left pixel in the original image is set as the origin, the upper left pixel position in the display image is set as the display position. Note that the display position is not limited to the upper left pixel position in the display image. The display position may be set at any other peak pixel position or a center pixel position in the display image.

The display magnification (enlargement) is a magnification at which the region of the original image displayed at the display unit 106 is displayed at the display apparatus 100. Here, the display magnification is defined on the basis of length ratio. Therefore, when the display magnification is two, the area (the number of pixels) is four times as large. According to the embodiment, the display magnification can be selected from those of the entire image display (the display magnification: 0.5×), equal magnification display (native display at a display magnification of 1×), and double enlargement display (at a display magnification of 2×). In the entire image display, the input 8K image is displayed at the entire display unit 106 with a 4K resolution. In the equal magnification display, a range (region) of the input 8K image which can be displayed with a 4K resolution is displayed at the display unit 106. In the double enlargement display, the above range is displayed enlarged at 2×.

As described above, when the display position and the display magnification are set, a region (a display region) of the original image to be displayed at the display unit 106 is determined. It can be construed that the display position and the display magnification (the screen resolution/the size of the display region) are determined by determining the display region. According to the embodiment, when no display position is set by the user, the display position is set so that the central part of the original image is positioned in the center of the display unit 106 as an initial setting. When no display magnification is set by the user, the equal magnification display is set as an initial setting.

The image generating unit 104 generates a display image from the image data (SDI signals) output from the input units 101a to 101d on the basis of the signal information output from the signal information obtaining unit 102 and the display position and the display magnification output from the setting unit 103. The image generating unit 104 outputs the generated display image to the image processing unit 105 which will be described.

According to the embodiment, the image generating unit 104 selects all the terminals a to d when the display magnification is greater than a threshold T1 and generates a display image using the image data a to d transmitted through the terminals a to d.

The image generating unit 104 selects the terminal a when the display magnification is smaller than the threshold T1 and generates a display image using the image data a transmitted through the terminal a. In this case, the image generating unit 104 generates the display image using all the images in the image data a. The method for generating the display image is merely an example and any one of the image data b to d transmitted through the terminals b to d may be selected and a display image may be generated accordingly.

Here, the threshold T1 is a value (display magnification: 1×) corresponding to the ratio between an image size (4K) which can be generated by the image generating unit 104 and the screen resolution (4K). Therefore, the image generating unit 104 uses the image data a to d for the equal magnification display and the double magnification display and the image data a for the entire image display. It may be construed that the image generating unit 104 determines the image data to be used for generating the display image depending on the number of pixels in the display region. For example, the image generating unit 104 generates a display image using the image data a to d (at least two image data) when the number of pixels in the display region is smaller than a prescribed threshold (which corresponds to when the display magnification is greater than the threshold T1). The image generating unit 104 generates a display image using the image data a to d when the number of the pixels in the display region is greater than the prescribed threshold (which corresponds to when the display magnification is smaller than the threshold T1).

FIG. 2A shows an example of the input 8K image. FIG. 2B shows an example of the display image generated by the image generating unit 104 when the set display magnification is 0.5× and the central part of the 8K image is displayed. In this case, the image generating unit 104 selects the terminal a among the terminals a to d and generates the display image using the image data a included in the SDI signal transmitted through the terminal a (the third image, a 4K sub image, 2160-line Sub-Image). Note that in the example shown in FIG. 2A, the display image is generated using the image data a included in the SDI signal at the terminal a, the image data to be used for the display image is not limited to the above. For example, the display image may be generated using any one of the image data b to d (the third image, a 4K sub image, 2160-line Sub-Image) included in the SDI signals transmitted through the terminals b to d.

Figure 2C:
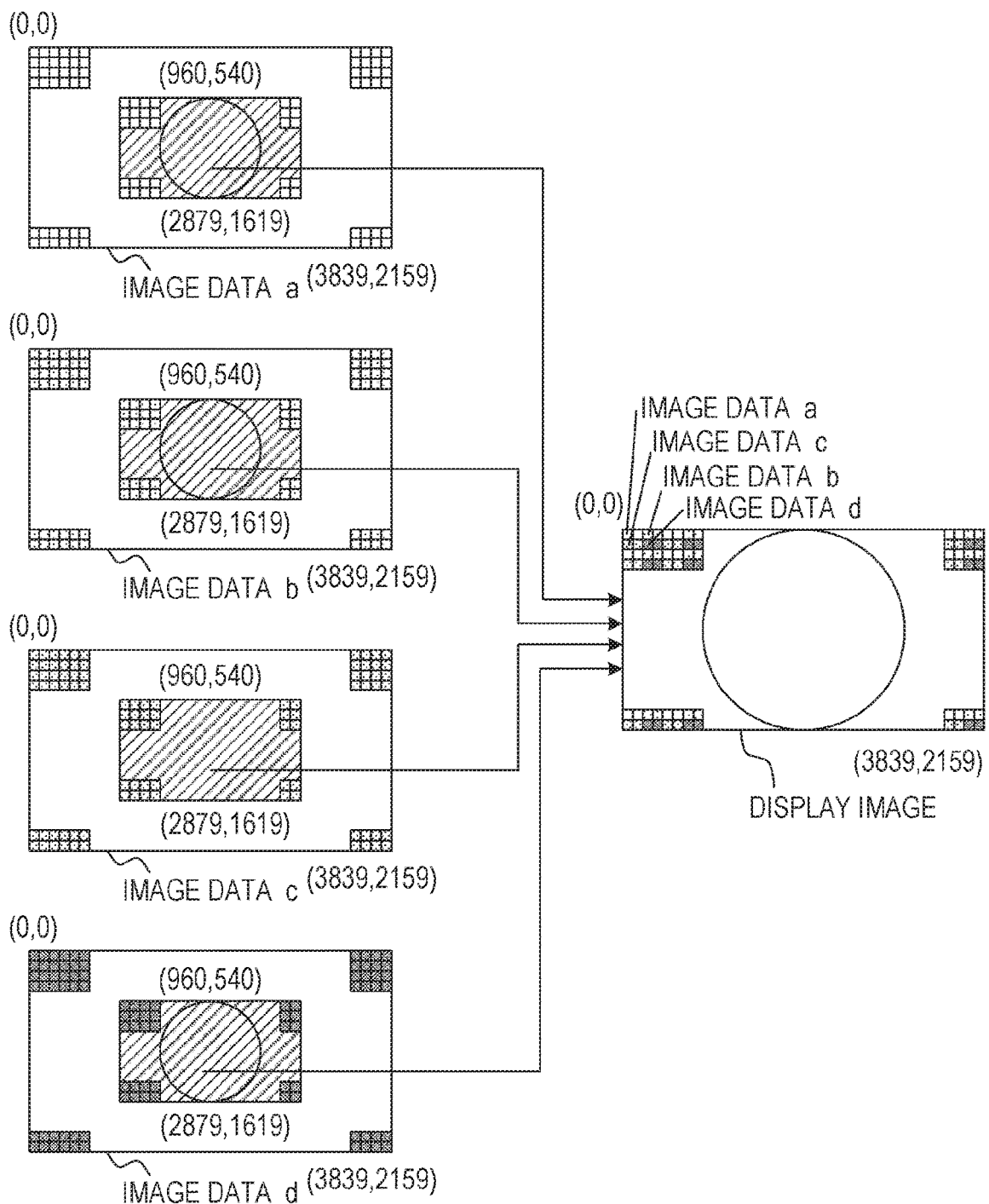
FIG. 2C is a view for illustrating the exemplary image generating method according to the first embodiment.

FIG. 2C shows an example of the display image generated by the image generating unit 104 when the set display magnification is 1× and the central part of the 8K image is displayed. In this case, the image generating unit 104 selects all the terminals a to d and generates a display image using all the image data a to d transmitted through the terminals a to d. More specifically, when the upper left parts of the image data are set as the origins, and the horizontal pixel h and the vertical pixel v (h, v) are at (960, 540), data having 1920×1080 pixels from (h, v)=(960, 540) is extracted from each of the image data a to d. The image generating unit 104 rearranges pixels in the extracted parts of the image data a to d for every two pixels to generate a display image (a 4K image).

Note that according to the embodiment, when the standard of the input signal is a standard other than Quad-Link 12G-SDI according to which four terminals constitutes a set, any one of the terminals (such as the terminal a) is selected and a 4K image (a 4K video image) is generated. The other standard may be Quad-Link 3G-SDI.

The image processing unit 105 applies image processing to the display image output from the image generating unit 104 on the basis of the display position and the display magnification output from the setting unit 103. The image processing unit 105 outputs the processed display image to the display unit 106. According to the embodiment, an image is extracted from the display image and enlarged to be displayed at the display unit 106. More specifically, the image processing unit 105 extracts a region of the display image to be displayed at the display unit 106 on the basis of the display position input by the user. The image processing unit 105 enlarges the extracted image on the basis of the set display magnification.

In the entire image display (the display magnification: 0.5×), the entire display image is displayed at the display unit 106, and therefore the extracting processing and the enlargement processing are not carried out. In the equal magnification display (the display magnification: 1×), the entire display image is similarly displayed at the display unit 106, and therefore the extracting processing and the enlargement processing are not carried out. In the double enlargement display (the display magnification: 2×), the image processing unit 105 extracts a region of the display image on the basis of the display position. The image processing unit 105 enlarges the extracted image (2K) at the display magnification (2×) and generates an image (a 4K image) to be displayed at the display unit 106.

Figure 3:
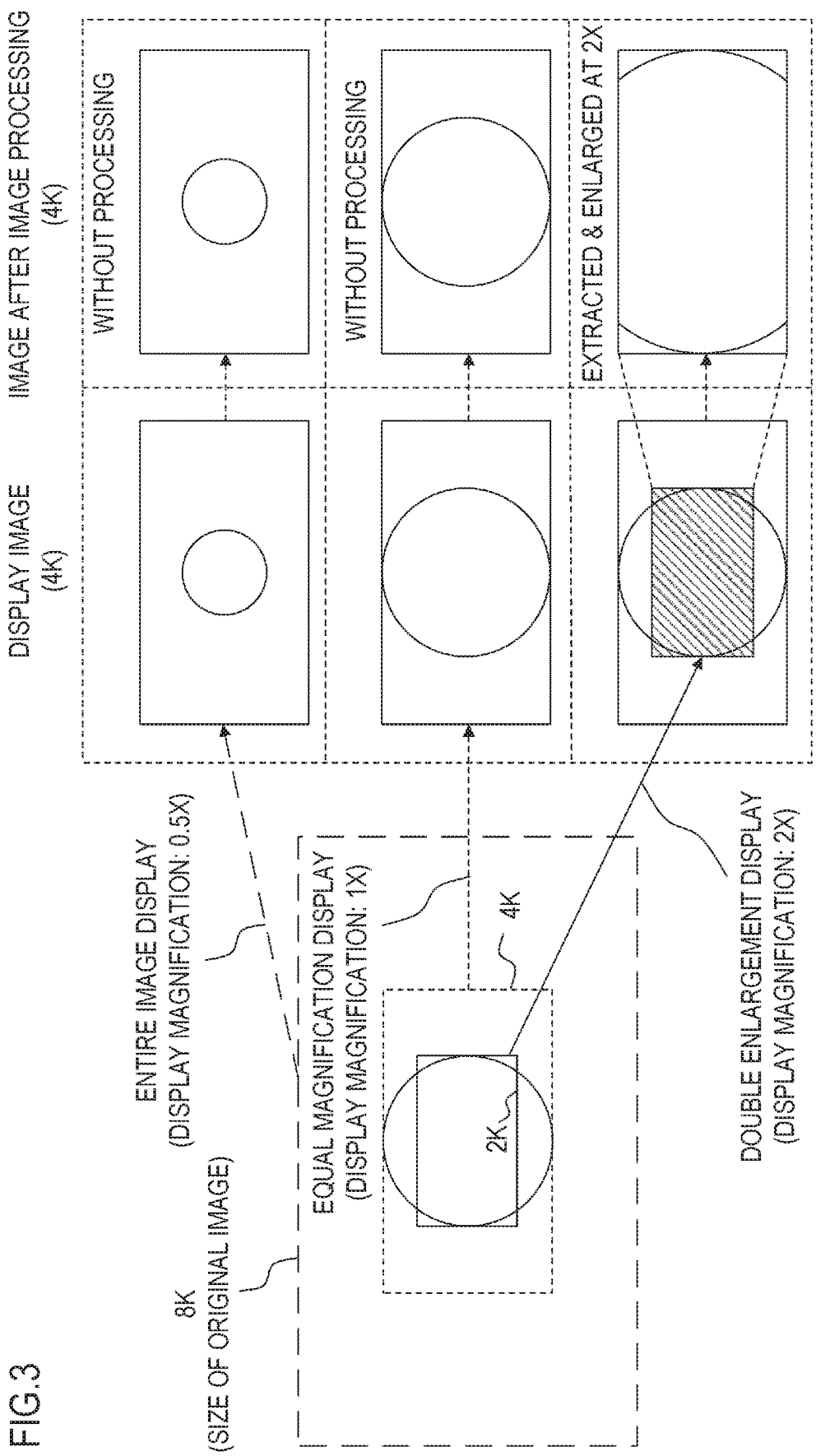
FIG. 3 is a view for illustrating an exemplary image processing method according to the first embodiment.

FIG. 3 shows a display image and an image after image processing (extraction or enlargement) when the set display magnification is 0.5× (the entire image display), 1× (the equal magnification display), or 2× (the double enlargement display). In the entire image display and the equal magnification display, the extraction processing and the enlargement processing are not carried out as described above. In the double enlargement display, the extraction processing is carried out on the basis of the display position, In the example in FIG. 3, a region (a 2K image) having a center in coincidence with the center of a display image (a 4K image) is extracted. Enlargement processing is carried out on the basis of the display magnification (2×). Note that the image processing unit 105 may carry out picture quality adjustment such as color conversion in addition to the enlargement processing.

The display unit 106 is a display apparatus which displays the display image output from the image processing unit 105 at the screen. According to the embodiment, the display unit 106 includes a liquid crystal panel capable of displaying a 4K image with a resolution of 3840×2160. Note that the structure of the display unit 106 is not particularly limited and the unit can display an image with a resolution of 4096×2160 or may be an OLED panel instead of the liquid crystal panel.

Figure 4:
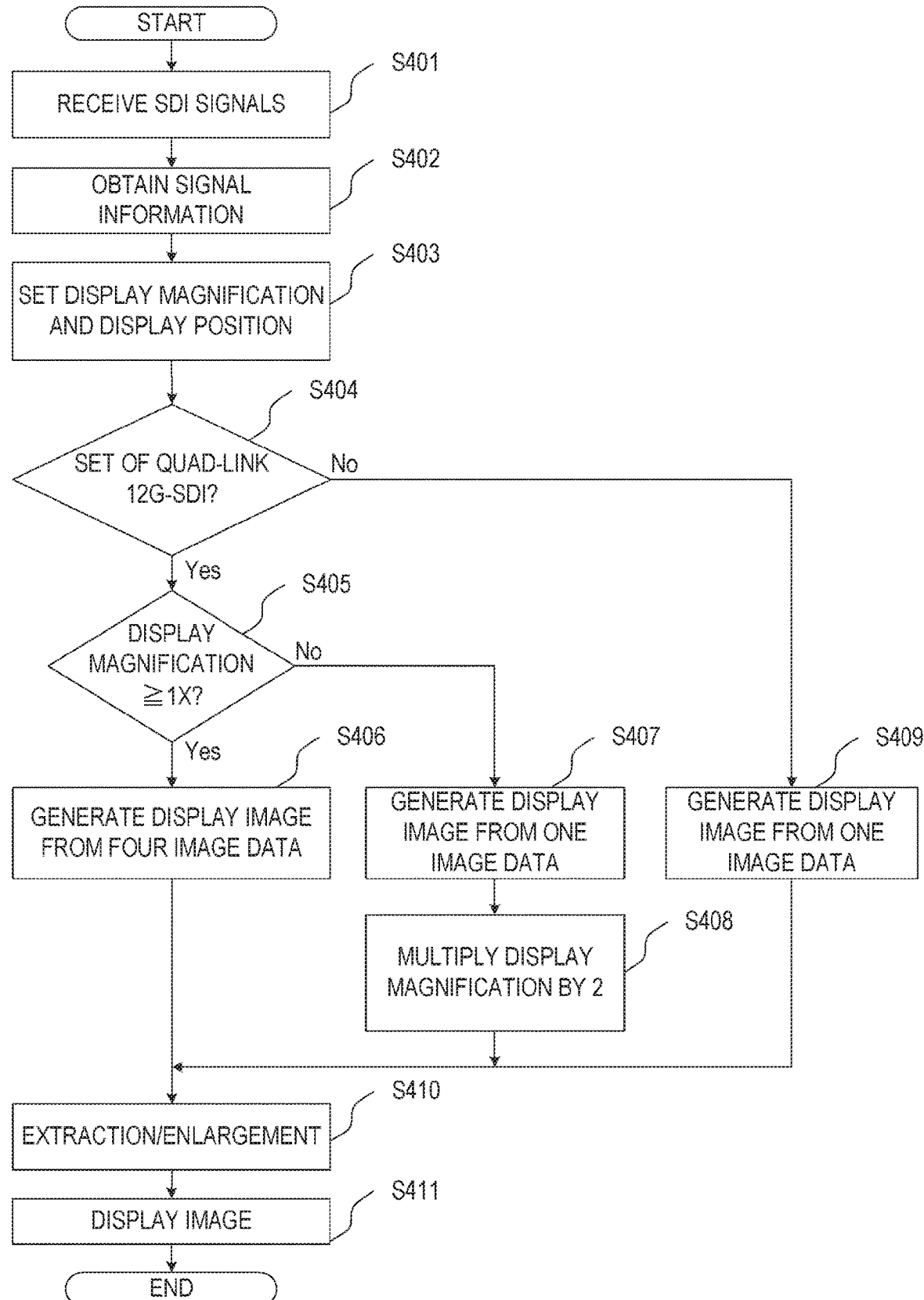
FIG. 4 is a flowchart for illustrating exemplary processing in the display apparatus according to the first embodiment.

FIG. 4 is a flowchart for illustrating processing performed by the display apparatus 100 according to the embodiment. In S401, the input units 101a to 101d receive SDI signals. In S402, the signal information obtaining unit 102 obtains signal information from the received SDI signals. In S403, the setting unit 103 accepts a display position and a display magnification on the basis of user's operation and outputs the position and magnification to the image generating unit 104 and the image processing unit 105. In S404, the image generating unit 104 determines whether the standard of the signals is Quad-Link 12G-SDI. When the standard of the input signal is Quad-Link 12G-SDI (Yes in S404), the process proceeds to processing in S405 and otherwise (No in S404) to processing in S409.

In S405, the image generating unit 104 determines whether the set display magnification is at least 1× (the threshold T1). When the display magnification is at least 1× (Yes in S405), the process proceeds to processing in S406 and otherwise (No in S405) to processing in S407.

In S406, the image generating unit 104 selects the four terminals, extracts a certain region (a region to be obtained) of each of the image data a to d, and generates a 4K image accordingly. In S407, the image generating unit 104 selects one terminal and generates a 4K image. In S408, the image processing unit 105 sets a value obtained by multiplying the input display magnification by two as an enlargement for enlargement processing. In S409, the image generating unit 104 selects one terminal and generates a 4K image.

In S410, the image processing unit 105 subjects the input display image (the 4K image) to extraction processing or enlargement processing on the basis of the display position and the display magnification input by the user. In S411, the display unit 106 displays an input display image at a liquid crystal panel.

Note that in the description of the embodiment, the case in which the display magnification is smaller than the threshold is only when the display magnification is 0.5×, but the display magnification is not limited to the above. For example, the display magnification may be set to 0.67 (at a display magnification of ⅔×, 6K reduction display) as a display magnification. In this case (No in S405), a display image is generated from one image data in S407. In S408, the enlargement is set to 4⁄3 (2×⅔). In addition, in S410, a region corresponding to the display region is extracted and the extracted region is subjected to the enlargement processing with the enlargement ratio.

According to the embodiment, in the entire image display, the entire region of the image data transmitted through one terminal is used to generate a display image image with a resolution of 4K). In the equal magnification display or the double enlargement display, only a region of each of the image data transmitted through the four terminals is used to generate a display image. In this way, in the display apparatus with a screen resolution of 4K, when an 8K image is input by the transmission method according to the Quad-Link 12G-SDI standard, picture quality degradation can be reduced in the equal magnification display and the double enlargement display. Note that according to the embodiment, the symbols of the image data (a to d) are determined on the basis of the symbols (a to d) of the terminals, the symbols (a to d) of the image data may be determined on the basis of LinkNumber (1 to 4) described in the payload ID in the signal information.

Second Embodiment

In the above-description of the embodiment, when the display magnification is at least the threshold T1, pixels in the same region are obtained from each of 4K images for all the four terminals. According to the embodiment, considering that the dividing method for the 8K image is the 2SI method, an example of how a region for obtaining pixels for each terminal is determined will be described. Hereinafter, functional units and processing having identical functions to the first embodiment are designated by the same reference numerals and their description will not be provided. Also according to the embodiment, the standard of the signal input to the display apparatus is Quad-Link 12G-SDI similarly to the first embodiment.

Figure 5:
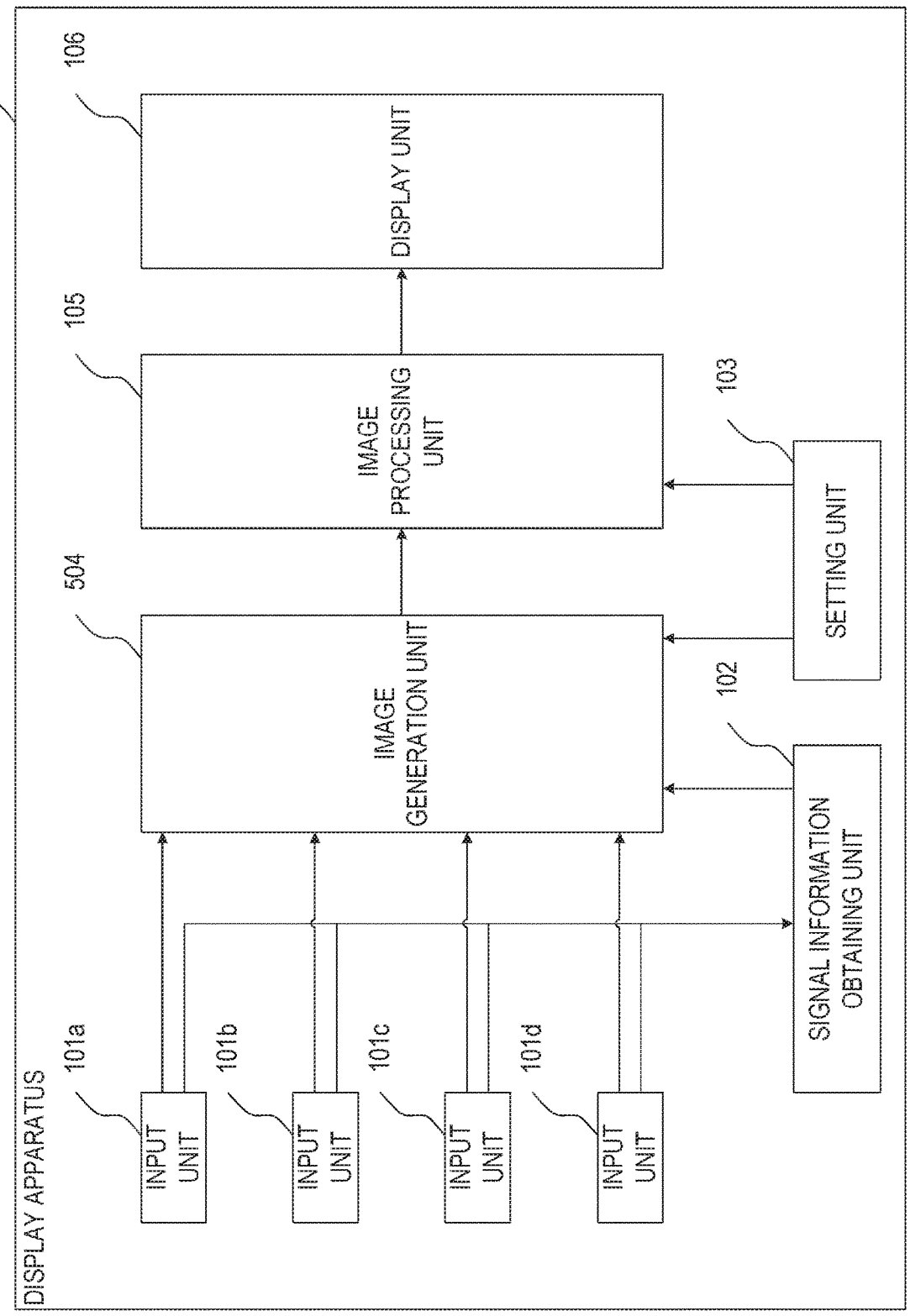
FIG. 5 is a functional block diagram of a display apparatus according to a second embodiment of the present invention.

FIG. 5 is a functional block diagram of a display apparatus 500 according to the embodiment. The display apparatus 500 includes an image generating unit 504 instead of the image generating unit 104 in the display apparatus 100 according to the first embodiment.

The image generating unit 504 is a functional unit which generates a display image from image data output from the input units 101a to 101d on the basis of signal information output from the signal information obtaining unit 102. and a display magnification and a display position output from the setting unit 103. The image generating unit 504 outputs the generated display image to the image processing unit 105.

According to the embodiment, when the display magnification is equal magnification or 2×, the image generating unit 504 obtains the regions closest to the display position in the original image from the image data a to d on the basis of the set display position. More specifically, the image generating unit 504 determines the regions to be obtained from the image data a to d so that the pixels in the region of the original image to be displayed at the display unit 106 are included. The image generating unit 504 determines the pixel arrangement in the display image on the basis of the display position of an 8K image.

Note that the method for generating a display image when the display magnification input by the user is 0.5 (the entire image display) is the same as that of the first embodiment and therefore the description will not be provided. The method for generating a display image when the standard of the signal to be input to the display apparatus 500 is not Quad-Link 12G-SDI is also the same as that of the first embodiment, and therefore the description will not be provided.

Figure 6C:
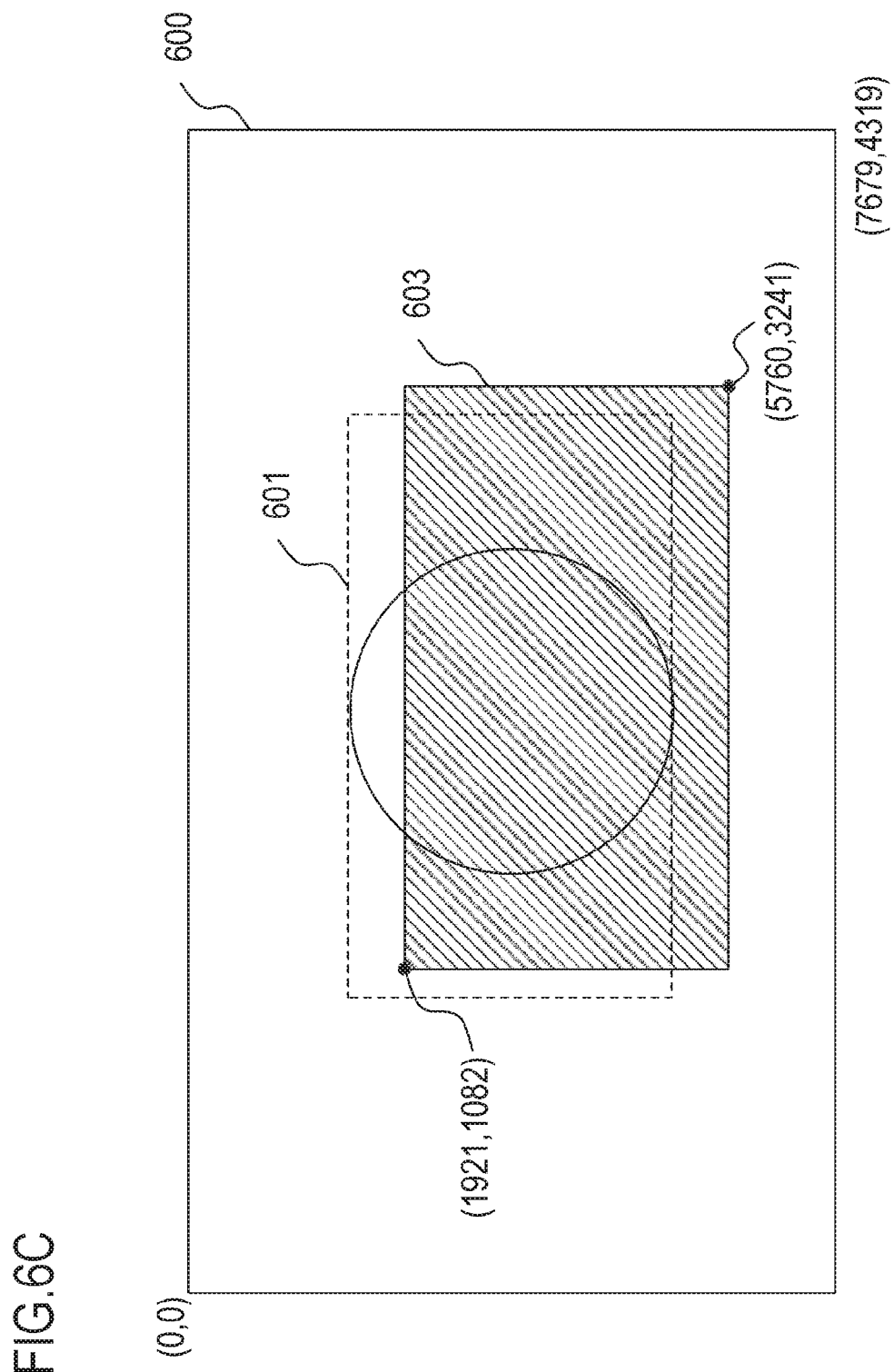
FIG. 6C is a view for illustrating the exemplary image generating method according to the second embodiment.

FIGS. 6A to 6D are views each showing an exemplary display image generated by the image generating unit 504 according to the embodiment. In FIG. 6A, the image 600 indicates an 8K image. The region 601 indicates a 4K image having its center in coincidence with the center of the 8K image. The region 602 indicates a region shifted +1 pixel each in the horizontal and vertical directions from the region 601. The coordinates on the upper left peak of the region 602 are (1921, 1081).

FIG. 6B shows image data a to d and a display image data when the upper left coordinates of the region 602 in the 8K image is set as a display position. The regions extracted from the image data a to d are regions each having 1920×1080 pixels from (x, y)=(961, 541), (960, 541), (961, 540) and (960, 540) (the shadowed parts in FIG. 6B).

In FIGS. 6A and 6B, the pixels in the image data a to d in the display image are sequentially arranged so that pixels in pixel data "3, 4, 4, 3, 3, 4, 4, 3, . . . " are arranged in the first (odd-numbered) row, and the pixels in the image data "1, 2, 2, 1, 1, 2, 2, 1, . . . " are sequentially arranged in the second (even-numbered) row.

The region 603 in FIG. 6C is a region shifted by +1 pixel in the horizontal direction and +2 pixels in the vertical direction from the region 601. The coordinates at the upper left peak of the region 603 are (1921, 1082). FIG. 6D shows image data a to d and a display image when the upper left coordinates of the region 603 in the 8K image are a display position. The regions to be extracted from the image data a to d are regions each having 1920×1080 pixels from (x, y)=(961, 541), (960, 541), (961, 541), and (960, 541) (the shadowed parts in FIG. 6D).

In FIGS. 6C and 6D, the pixels in the image data a to d in the display image are sequentially arranged so that pixels in pixel data "1, 2, 2, 1, 1, 2, 2, 1, . . . " are arranged in the first (odd-numbered) row, and the pixels in the image data "3, 4, 4, 3, 3, 4, 4, 3, . . . " are sequentially arranged in the second (even-numbered) row.

As described above, according to the embodiment, when an 8K image is input to the display apparatus with a screen resolution of 4K, the regions to be extracted (regions to be obtained) from the image data a to d are determined for each of the terminals, and the pixels in the display image are arranged as described above. In this way, the display image having the pixel arrangement in conformity with the pixel arrangement of the original image (the 8K image) can be generated. Note that the extraction position of the image data a to d and the pixel arrangement are given by way of illustration, and when for example the image data a to d are not 2SI data but images divided for each pixel, the display image may be generated in consideration of the pixel arrangement of the image data a to d. Note that the positional relation between the original 8K image and image data obtained by division on a pixel basis may be obtained as signal information.

Third Embodiment

In the description of the embodiment, the input 8K image is displayed using one display apparatus (a 4K display apparatus) with a screen resolution of 4K. According to a third embodiment of the invention, a display system (a multi-display system) for displaying images using a plurality of display apparatuses will be described. More specifically, an 8K image input by combining four 4K display apparatuses is displayed. In one of the four apparatuses, the display position for the 8K image in each of the display apparatuses is determined on the basis of arrangement of each of the display apparatuses set by the user. Note that the functional units identical to those of the first embodiment are designated by the same reference numerals and their description will not be provided.

FIG. 7 is a diagram showing the arrangement of four display apparatuses 700a to 700d in the multi-display system according to the embodiment. FIG. 7 is a functional block diagram of the display apparatuses 700a to 700d. The display apparatuses 700a to 700d each include a setting unit 703 instead of the setting unit 103 in the display apparatus 100 according to the first embodiment. The display apparatuses 700a to 700d each further include an arrangement setting unit 707 and a communication unit 708 in addition to the functional units of the display apparatus 100 according to the first embodiment.

The arrangement setting unit 707 is a functional unit which determines the arrangement of the display apparatuses 700a to 700d in the multi-display system. According to the embodiment, the arrangement of the display apparatuses 700a to 700d are determined in response to setting operation by the user using buttons provided in each of the display apparatuses 700a to 700d or a keyboard connected to each of the display apparatuses 700a to 700d. When the four display apparatuses are provided in the vertical and horizontal direction as the arrangement, four positions, the upper left, the upper right, the lower left, and the lower right may be selectable, and allocated to the display apparatuses 700a to 700d, respectively. The arrangement setting unit 707 outputs the determined arrangement positions of the display apparatuses to the setting unit 703.

Note that the communication unit 708 which will be described may transmit/receive the set arrangement information to/from any of the other display apparatuses in the multi-display system. In this case, upon receiving the arrangement information, the display apparatus changes the arrangement information on itself on the basis of the arrangement information. For example, when the arrangement information set at the source and the arrangement information on itself overlap, the arrangement information of itself is changed to pre-setting arrangement information at the display apparatus at the source.

The communication unit 708 is a functional unit which transmits/receives a display position, a display magnification or arrangement information set by each of the display apparatuses to/from the communication unit 708 in another display apparatus in the multi-display system. The communication unit 708 obtains each piece of information to be transmitted from the setting unit 703 in transmitting the information and outputs each kind of received information to the setting unit 703 upon receiving the information.

The setting unit 703 is a function unit which outputs, to the communication unit 708, a display position and a display magnification set by the user in addition to the function of the setting unit 103. The setting unit 703 calculates a display position on the basis of the arrangement information output from the arrangement setting unit 707 and outputs the display position and the display magnification to the image generating unit 104 and the image processing unit 105.

Here, according to the embodiment, the display magnification can be selected between those of the equal magnification display (display magnification: 1×) and the double enlargement display (display magnification: 2×). The display position according to the embodiment is the position of the upper left pixel of the image displayed at the multi-display system when the upper left pixel is set as the origin in the input 8K image. Similarly to the setting unit 103 according to the first embodiment, a display position (a multi-display display position) and a display magnification are set by user operation using buttons or the like provided in the display apparatuses 700a to 700d. When the display position and the display magnification are received from a display apparatus other than its own apparatus in the multi-display system through the communication unit 708, the display position and the display magnification are set.

The setting unit 703 calculates individual display positions as the display positions of the display apparatuses from the display position and the display magnification on the basis of the arrangement information output from the arrangement setting unit 707, and outputs the result of calculation to the image generating unit 104 and the image processing unit 105.

In the following description of the embodiment, the display apparatuses 700a to 700d in the multi-display system are arranged in the upper left, the upper right, the lower left, and the lower right positions (the display positions a to d) by way of illustration. Here, in an input 8K image, when the display position is (X, Y) as the upper left pixel is set as the origin, the individual display positions (x, y) of the display apparatuses 700a to 700d are represented by the following expressions (1) to (4).

$$(x, y) = (X, Y) \quad (1)$$

$$(x, y) = \left(X + \frac{X\max}{M} \times \frac{1}{2}, Y\right) \quad (2)$$

$$(x, y) = \left(X, Y + \frac{Y\max}{M} \times \frac{1}{2}\right) \quad (3)$$

$$(x, y) = \left(X + \frac{X\max}{M} \times \frac{1}{2}, Y + \frac{Y\max}{M} \times \frac{1}{2}\right) \quad (4)$$

In the expressions, M is the display magnification, Xmax and Ymax are the numbers of input pixels in the horizontal and vertical directions, respectively, and for an 8K image, Xmax=7680 and Ymax=4320. Note that Xmax/M is the number of pixels in the horizontal direction in the region obtained from the 8K image, and Ymax/M is the number of pixels in the vertical direction in the region obtained from the 8K image.

FIG. 8 shows an example of display when an 8K image is displayed at equal magnification in the multi-display system according to the embodiment. In this case, the individual display positions (x, y) of the display apparatuses 700a to 700d corresponding to display positions a to d are (0, 0), (3840, 0), (0, 2160), and (3840, 2160). When the central region of the 8K image is displayed at a magnification of 2×, the individual display positions (x, y) of the display apparatuses 700a to 700d are (1920, 1080), (3840, 1080), (1920, 2160), and (3840, 2160).

Figure 9:
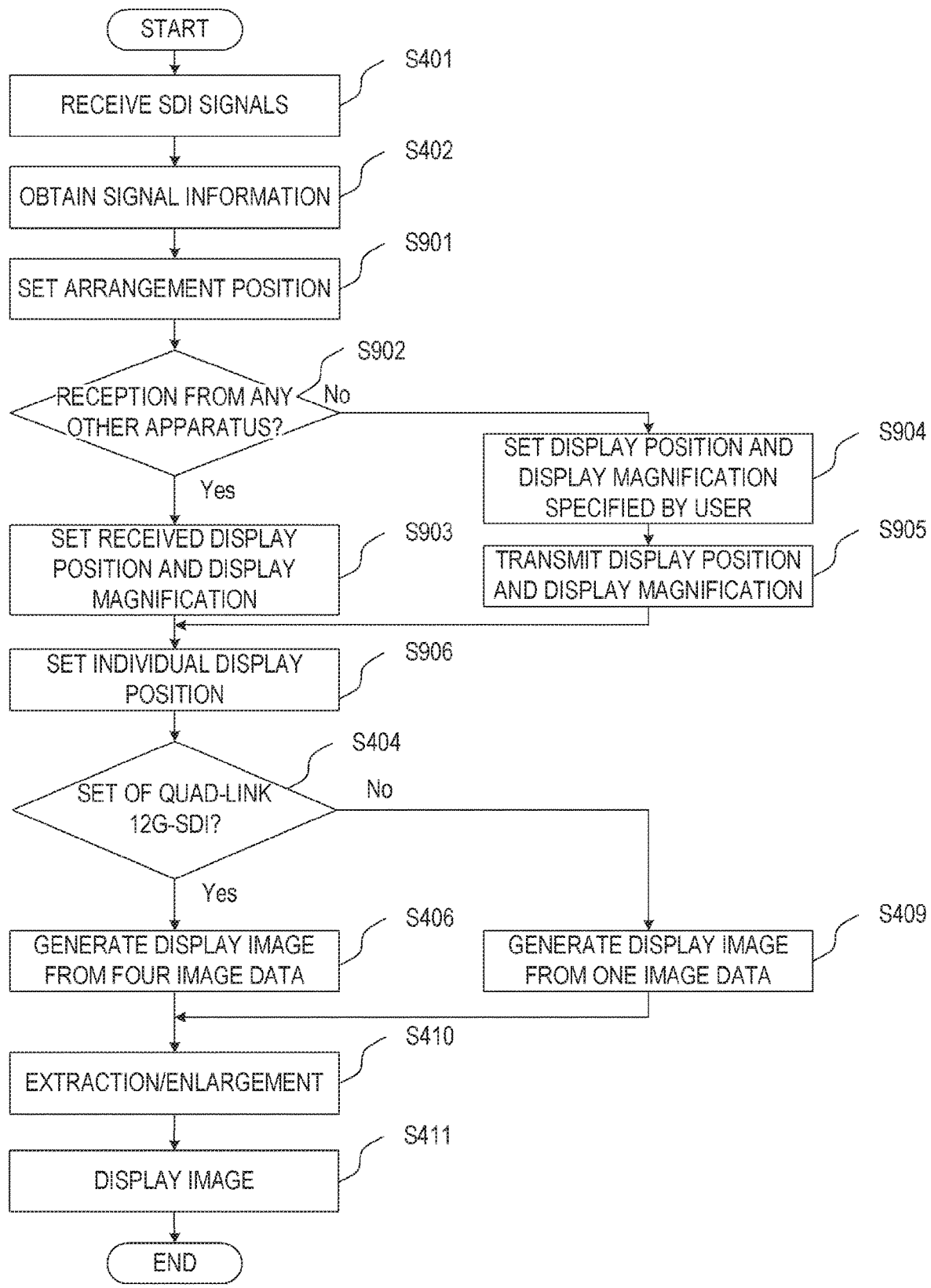
FIG. 9 is a flowchart for illustrating exemplary processing in the display apparatus according to the third embodiment.

FIG. 9 is a flowchart for illustrating processing by the display apparatuses 700a to 700d according to the embodiment. In the following description, arrangement information is set in the display apparatus 700a, while the arrangement information may be set in any of the display apparatuses 700a to 700d.

The reception of the SDI signals (S401) and the obtaining of the signal information (S402) are performed similarly to the first embodiment. In S901, the arrangement setting unit 707 sets arrangement information on the basis of user operation. In S902, the display apparatus 700a determines whether the display position and display magnification in the multi-display system have been received from any of the other display apparatuses 700b to 700d through the communication unit 708.

When the display position and the display magnification have been received from another display apparatus (Yes in S902), the process proceeds to S903 and otherwise (No in S902), the process proceeds to S904. In S903, the setting unit 703 sets the display position and the display magnification received from any of the other display apparatuses 700b to 700d in its own apparatus (the display apparatus 700a). In S904, the setting unit 703 sets the display position and the display magnification set by user's operation for its own apparatus (700a) to the apparatus. In S905, the display apparatus 700a transmits the display position and display magnification set for itself to the other display apparatuses 700b to 700d through the communication unit 708.

In step S906, the setting unit 703 sets the individual display position on the basis of the arrangement information, the display position, and the display magnification. Subsequent steps (S404, S406, and S409 to S411) are the same as those of the first embodiment and their will not be provided.

As in the foregoing, the individual display positions among the display apparatuses 700a to 700d are determined on the basis of the arrangement information, the display position, and the display magnification, so that the multi-display system which carries out 8K display by combining a plurality of display apparatuses can be provided. According to the embodiment, as the user operates any one of the display apparatuses 700a to 700d, the arrangement information, the display position, and the display magnification are set, while who or what carries out the setting is not particularly limited. For example, when the user may set the arrangement information, the display position, and the display magnification using an external apparatus and may determine setting values for its own apparatus on the basis of various setting values transmitted from the external apparatus.

In the above example, the multi-display system is formed using the four display apparatuses, while the number of the display apparatuses is not limited. When the arrangement information is set by a particular display apparatus or an external apparatus, the arrangement setting unit 707 is not necessary in the other display apparatuses. In combination with the second embodiment, in the double enlargement display, appropriate pixels can be obtained from the image data a to d input to the multi-display system according to the embodiment. In the multi-display system, a display magnification less than 1 may be set. For example, when the display magnification is 0.5×, a display image may be generated on the basis of one of the image data a to d similarly to the first embodiment, and the generated display image may be displayed at any of the display apparatuses 700a to 700d. When the display magnification is 0.67×, a display image may be generated on the basis of any one of the image data a to d. similarly to the above and displayed across the display apparatuses 700a to 700d.

Fourth Embodiment

In the description of the previous embodiment, the resolution which can be processed in the 4K display apparatus is 4K. Here, in the 4K display apparatus, an image with a resolution which is smaller than an 8K image and greater than a 4K image (such as a 6K image) can be generated so that extra capacity or capability is available to the memory capacity or the processing capability. Therefore, in the following description of the embodiment, when an 8K image is input as a Quad-Link 12G-SDI input, a 4K display apparatus can generate a 6K image. In such a display apparatus, an image with a greater resolution than the screen resolution is generated, so that a degradation in the picture quality can be reduced when the display is carried out with a smaller display magnification (such as a magnification of 0.67×) than equal magnification (display magnification: 1×). The functional units identical to those of the first embodiment are designated by the same reference numerals and their description will not be provided.

Figure 10:
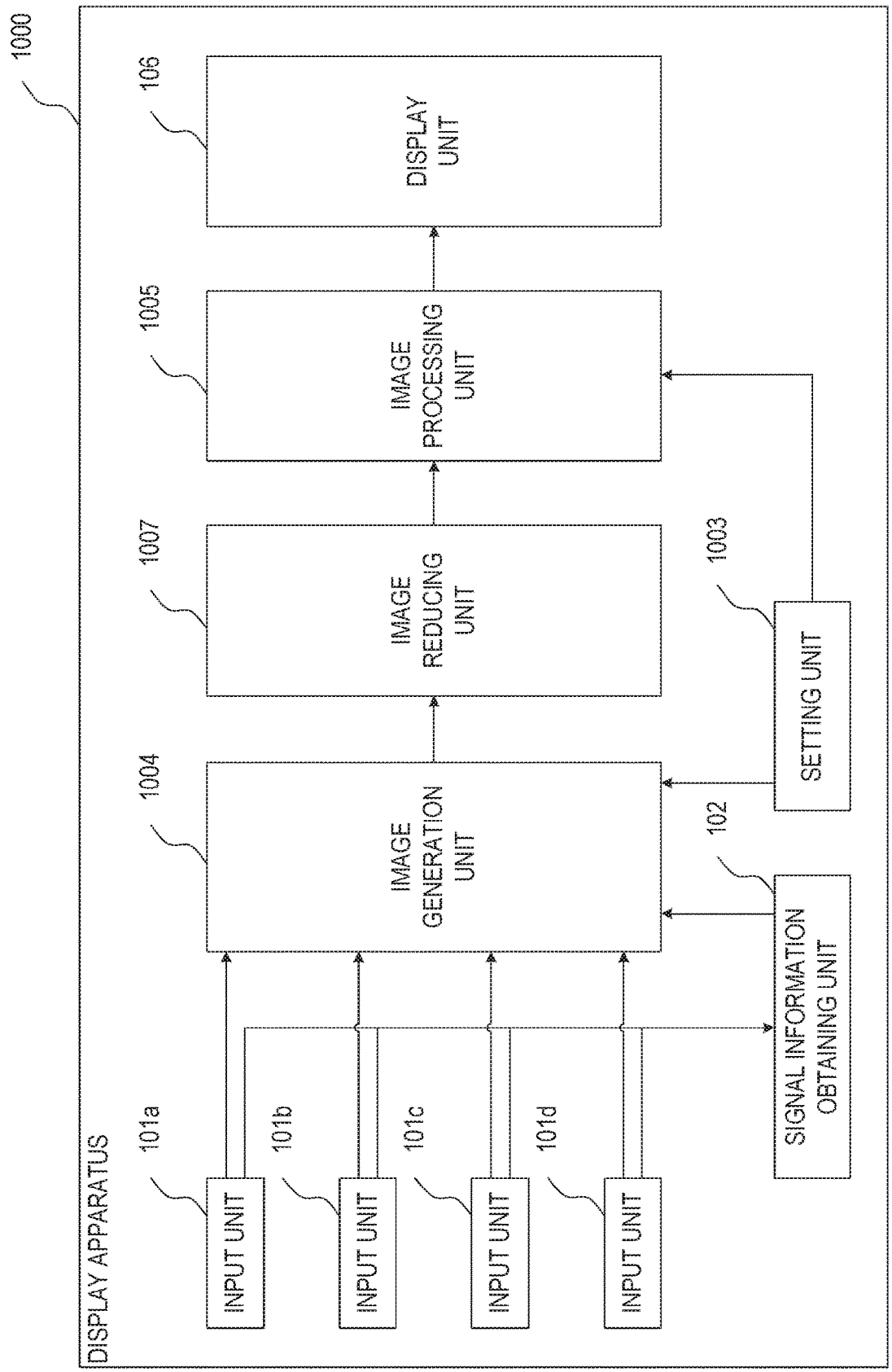
FIG. 10 is a functional block diagram of a display apparatus according to a fourth embodiment of the present invention.

FIG. 10 is a functional block diagram of a display apparatus 1000 according to the embodiment. The display apparatus 1000 includes a setting unit 1003, an image generating unit 1004. and an image processing unit 1005 instead of the setting unit 103, the image generating unit 104, and the image processing unit 105 in the display apparatus 100 according to the first embodiment. The display apparatus 1000 further includes an image reducing unit 1007 in addition to the functional units of the display apparatus 100 according to the first embodiment.

The setting unit 1003 can select 6K reduction display (display magnification: 0.67×) according to the embodiment in addition to the function of the setting unit 103 in the display apparatus 100 according to the first embodiment. More specifically, the user can select a display magnification from those of the entire image display, the 6K reduction display, the equal magnification display, and the double enlargement display. Here, the 6K reduction display is a setting by which a region of an input 8K image having 5760×3240 (6K) pixels from the display position set by the user is reduced to an image having 3840×2160 (4K) pixels and the reduced image is displayed at the screen.

The image generating unit 1004 is a functional unit which generates a display image from the SDI signals output from the input units 101a to 101d on the basis of the signal information output from the signal information obtaining unit 102, the display position and the display magnification output from the setting unit 1003. The image generating unit 1004 outputs the generated display image to the image reducing unit 1007 which will be described.

According to the embodiment, the display apparatus 1000 can process images up to a 6K image, and therefore when the set display magnification is a 6K reduction magnification, the image generating unit 1004 selects the four terminals, extracts a region from each of the image data a to d and generates a 6K image (a display image).

Figure 11:
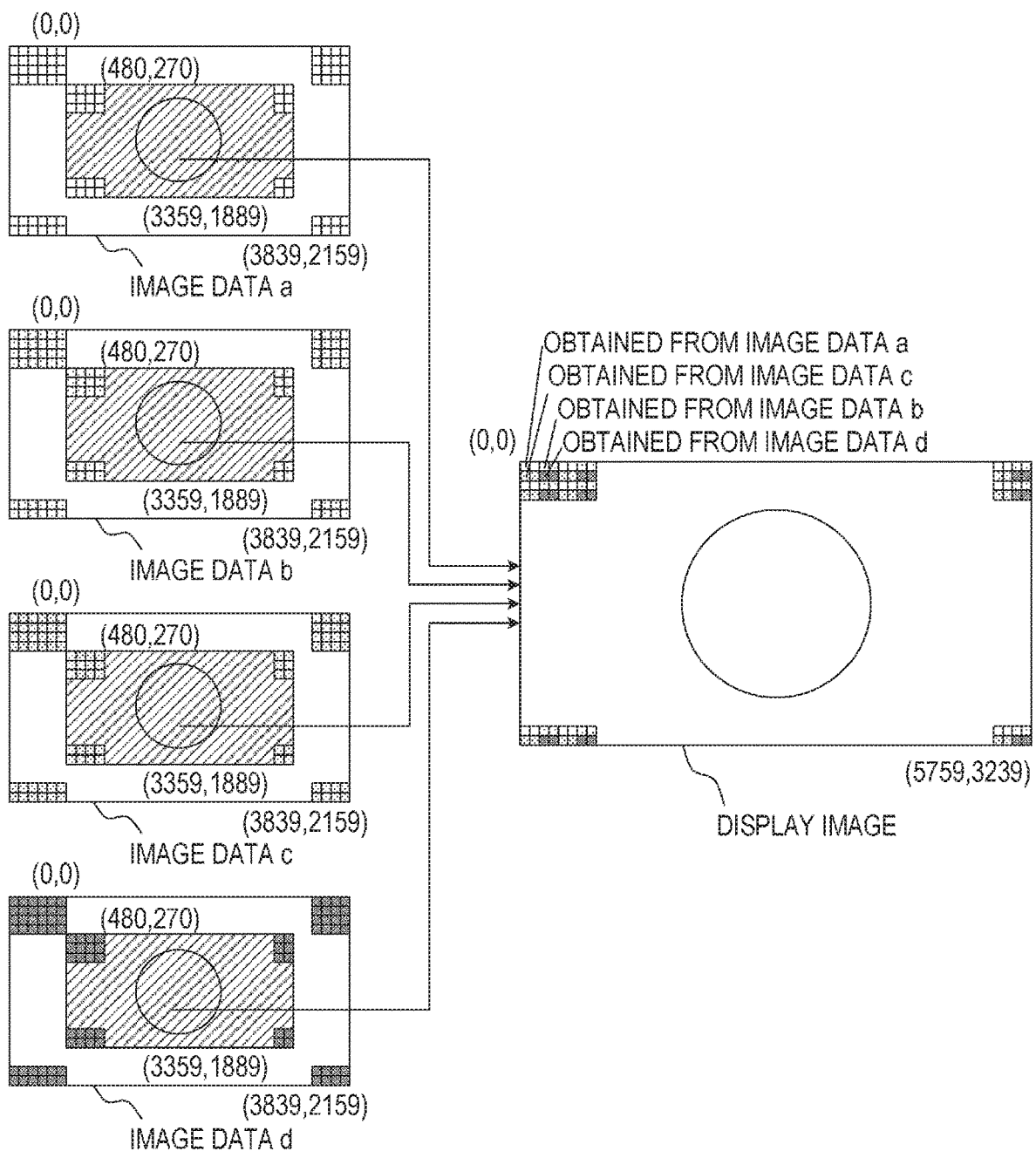
FIG. 11 is a view for illustrating an exemplary image generating method according to the fourth embodiment.

FIG. 11 shows a display image (a 6K image) generated when the central region of an input 8K image is reduced into the 6K image and displayed and the image data a to d. As indicated by the shadowed parts in FIG. 11, 2880×1620 pixels (a half of 6K) are extracted from the position (h, v)=(480, 270) from each of the image data a to d, and rearranged for each two pixels, so that the display image is generated.

The image reducing unit 1007 is a functional unit which reduces a 6K display image output from the image generating unit 1004 into a 4K image. The image reducing unit 1007 outputs the reduce display image to the image processing unit 1005. Note that when the image output from the image generating unit 1004 is a 4K image, the image reducing unit 1007 outputs the image directly to the image processing unit 1005 without carrying out reduction processing.

The image processing unit 1005 is a functional unit which subjects the display image output from the image reducing unit 1007 to image processing on the basis of a display position and a display magnification output from the setting unit 1003. According to the embodiment, when the display magnification is 0.67× (6K reduction display), enlargement processing is not carried out. When the display magnification is not in the range of at least 0.67 and less than 1, the extraction processing and enlargement processing are carried out similarly to the first embodiment.

Figure 12:
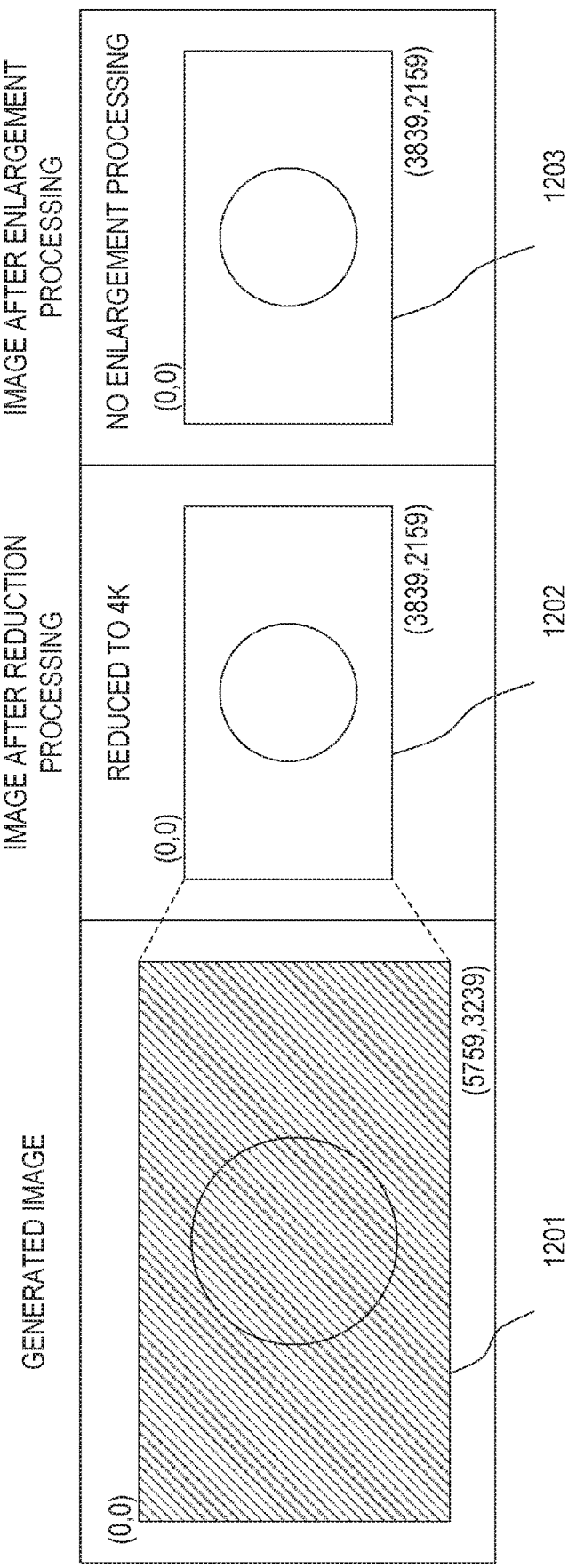
FIG. 12 is a view for illustrating an exemplary image processing method according to the fourth embodiment.

FIG. 12 is a view showing a display image according to the embodiment when the display magnification is 0.67×. The image 1201 is a display image (a 6K image) generated by the image generating unit 1004. The image 1202 is a display image (a 4K image) obtained by reduction by the image reducing unit 1007. The image 1203 is a display image (a 4K image) obtained after processing by the image processing unit 1005. As described above, when the display magnification is 0.67×, the image processing unit 1005 does not perform enlargement processing.

Figure 13:
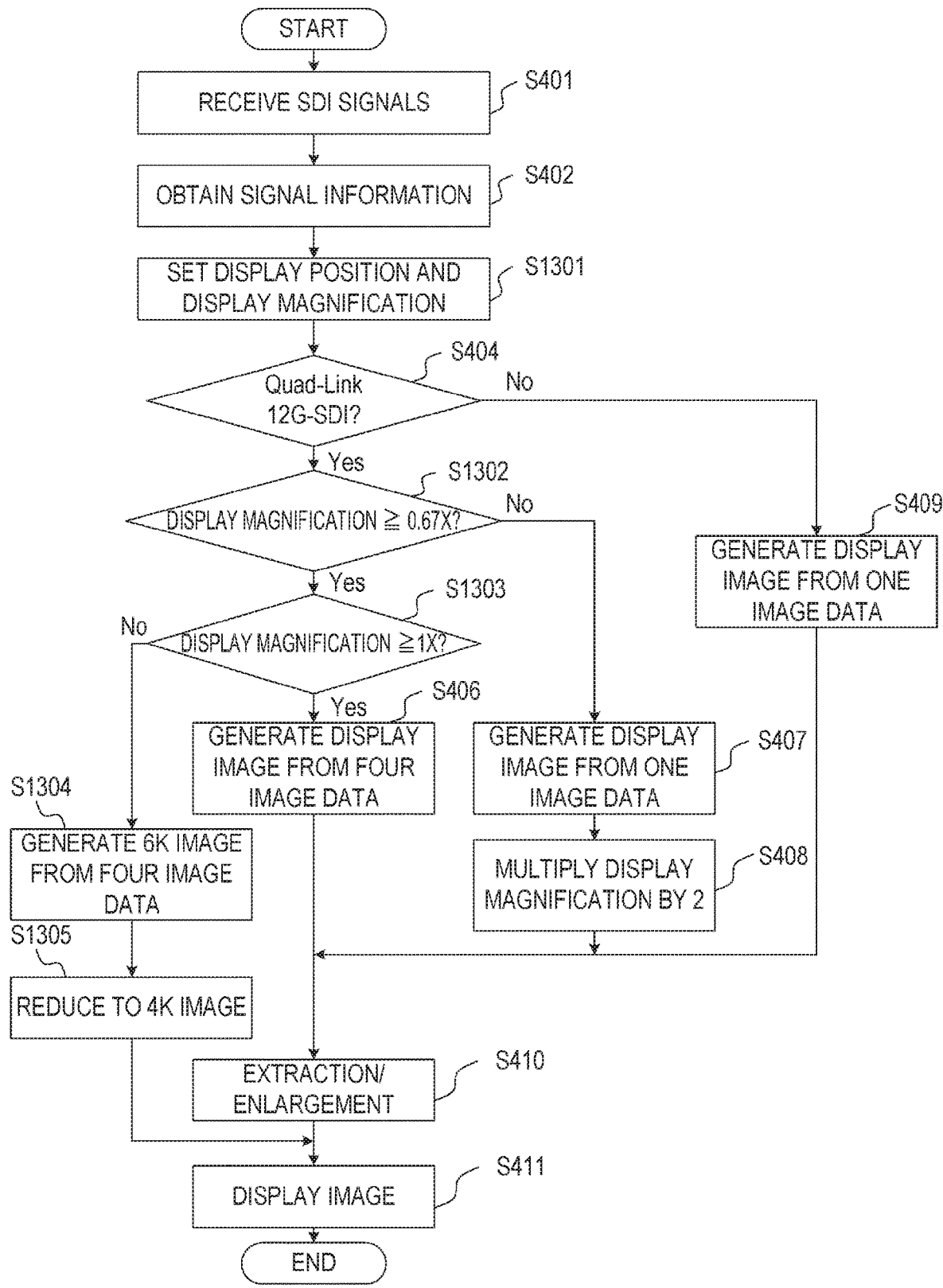
FIG. 13 is a flowchart for illustrating exemplary processing in the display apparatus according to the fourth embodiment.

FIG. 13 is a flowchart for illustrating processing performed by the display apparatus 1000. The reception of SDI signals (S401) and the obtaining of the signal information (S402) are carried out similarly to the first embodiment.

In S1301, the setting unit 1003 sets a display position and a display magnification on the basis of user operation. According to the embodiment, 6K reduction may be set as a display magnification. Similarly to the first embodiment, it is determined whether the standard of an input signal is Quad-Link 12G-SDI (S404). When the standard of an input signal is Quad-Link 12G-SDI (Yes in S404), the process proceeds to S1302, and otherwise (No in S404) to the processing in S409.

In S1302, the image generating unit 1004 determines whether the display magnification is at least 0.67× (a threshold T2). When the set display magnification is at least 0.67× (Yes in S1302), the process proceeds to S1303 and otherwise (No in S1302) to processing in S407.

Here, a method for calculating the threshold T2 will be described. When the display apparatus 1000 can an image having a resolution greater than the screen resolution because of the memory or processing capability, the threshold T2 is obtained by the following expression. Here, P is the screen resolution (4K), and R is the resolution (6K) which can be processed by the display apparatus 1000, When P=4K and R=6K, T2=0.67 results from the following expression (5)

$$T2 = \frac{P}{R} \tag{5}$$

In S1303, the image generating unit 1004 determines whether the display magnification is at least 1 (the equal magnification display). When the set display magnification is at least 1 (Yes in S1303), the process proceeds to S406 and otherwise (No in S1303) to processing in S1304.

In S1304, the image generating unit 1004 selects four terminals, extracts some pixels from four image data a to d and generates a display image (a 6K image). In S1304, the image reducing unit 1007 reduces the display image as the 6K image into a 4K image. The processing from S406 to S411 is the same as the first embodiment, and the description will not be provided.

As described above, when an 8K image according to Quad-Link 12G-SDI is input to the 4K display apparatus capable of generating a 6K image, the picture quality degradation can be reduced by reducing the generated 6K image into the 4K image and displaying the reduced image. Note that in combination with the second embodiment, appropriate pixels can be obtained from the image data a to d corresponding to the display positions.

Fifth Embodiment

In the description of the first to fourth embodiments, the method for dividing the 8K image is based on 2SI. In the following description of a fifth embodiment, four signals (image data) obtained by division according to a SQD (Square Division) method as a method for dividing an 8K image are input to the display apparatus. Note that the functional units identical to those of the first embodiment are designated by the same reference characters and their description will not be provided.

Figure 14:
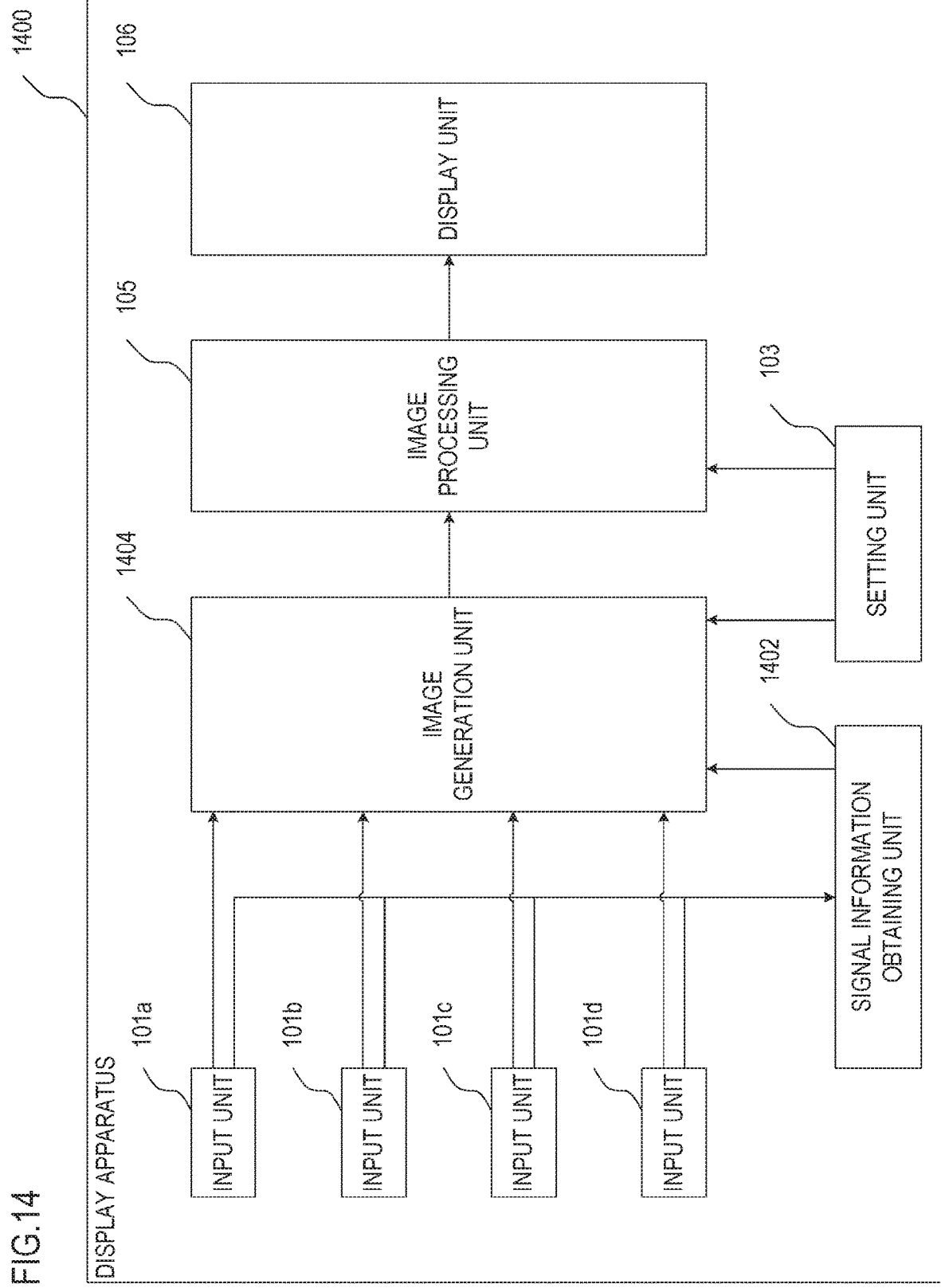
FIG. 14 is a functional block diagram of a display apparatus according to a fifth embodiment of the present invention.

FIG. 14 is a functional block diagram of the display apparatus 1400. The display apparatus 1400 includes a signal information obtaining unit 1402 and an image generating unit 1404 instead of the signal information obtaining unit 102 and the image generating unit 104 in the display apparatus 100 according to the first embodiment.

The signal information obtaining unit 1402 is a functional unit which obtains signal information on SDI signals output from the input units 101a to 101d and outputs the obtained information to the image generating unit 1404. According to the embodiment, the signal information obtaining unit 1402 obtains for example information indicating a method for dividing an 8K image from the obtained information.

The image generating unit 1404 generates a display image from the SDI signals output from the input units 101a to 101d on the basis of the signal information, a display magnification, and a display position and outputs the generated image to the image processing unit 105. According to the embodiment, the image generating unit 1404 determines whether the dividing method for the signals from the four terminals is based on SQD on the basis of the signal information output from the signal information obtaining unit 1402.

According to the embodiment, image data a to d obtained by dividing according to the SQD method are input to the display apparatus 1400. Therefore, when the display magnification is at least 1 (such as in the case of the equal magnification display or the double enlargement display), the image generating unit 1404 generates a display image (a 4K image) by obtaining a region corresponding to the display position from some or all of the image data a to d.

When the display magnification is less than 1 (such as in the case of the entire image display), the image generating unit 1404 generates a display image using all the image data a to d. Here, unlike the 2SI method described in connection with the first embodiment, all the images obtained by division must be used in order to display the original image according to the SQD method, while the 4K display apparatus cannot process an 8K image.

Therefore, according to the embodiment, the image generating unit 1404 further divides the image data a to d on a pixel-basis according to the 2SI method and generates 2K sub images a to d (sub image data a to d) as 2K (1920×1080) images. The image generating unit 1404 extracts a 2K sub image a (a 2K image) from each of the image data a to d and generates a display image (a 4K image). Note that any one of the 2K sub images a to d may be extracted from each of the image data.

Figure 15A:
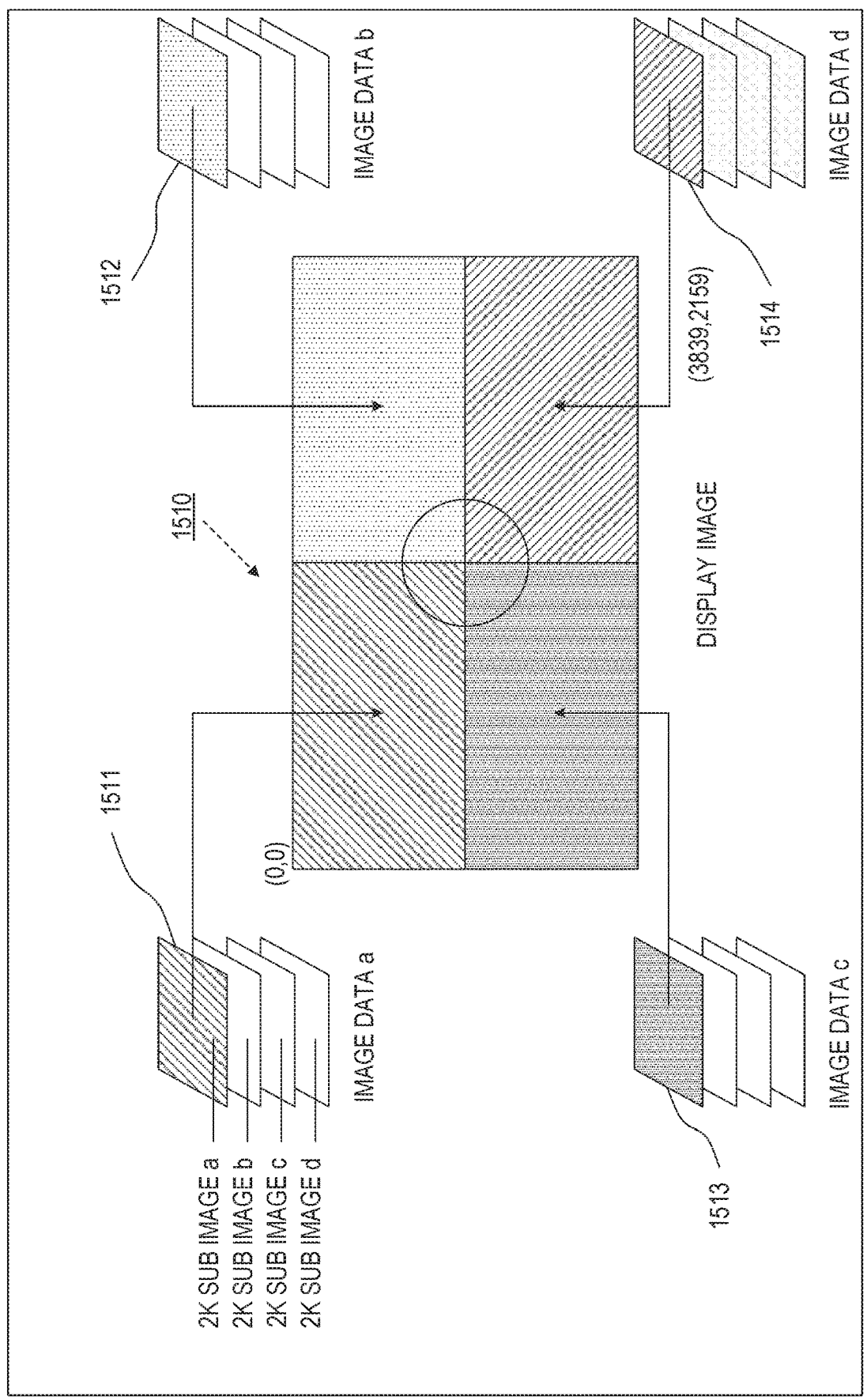
FIG. 15A is a view for illustrating an exemplary image generating method according to the fifth embodiment.

FIGS. 15A to 15C are views for illustrating a method for generating a display image according to the embodiment. FIG. 15A shows 2K sub images 1511 to 1514 and a display image 1510 when the display magnification is 0.5 (the entire image display). The display image 1510 is generated using pixels included in all other regions of the 2K sub images 1511 to 1514.

FIG. 15B shows the image data a to d and a display image 1520 when the central region in the input 8K image is displayed in equal magnification display at a display magnification of 1×. The display image 1520 is generated using the pixels included in the regions 1521 to 1524 of the image data a to d.

FIG. 15C shows the image data a to d and a display image 1530 when the upper right region in the input 8K image is displayed in equal magnification display at a display magnification of 1×. The display image 1530 is generated using the pixels included in the entire region 1531 of the image data b, Note that in the double enlargement display, a display image is generated similarly to the equal magnification display, and an image obtained by enlarging the display image using the image processing unit 105 is displayed.

Figure 16:
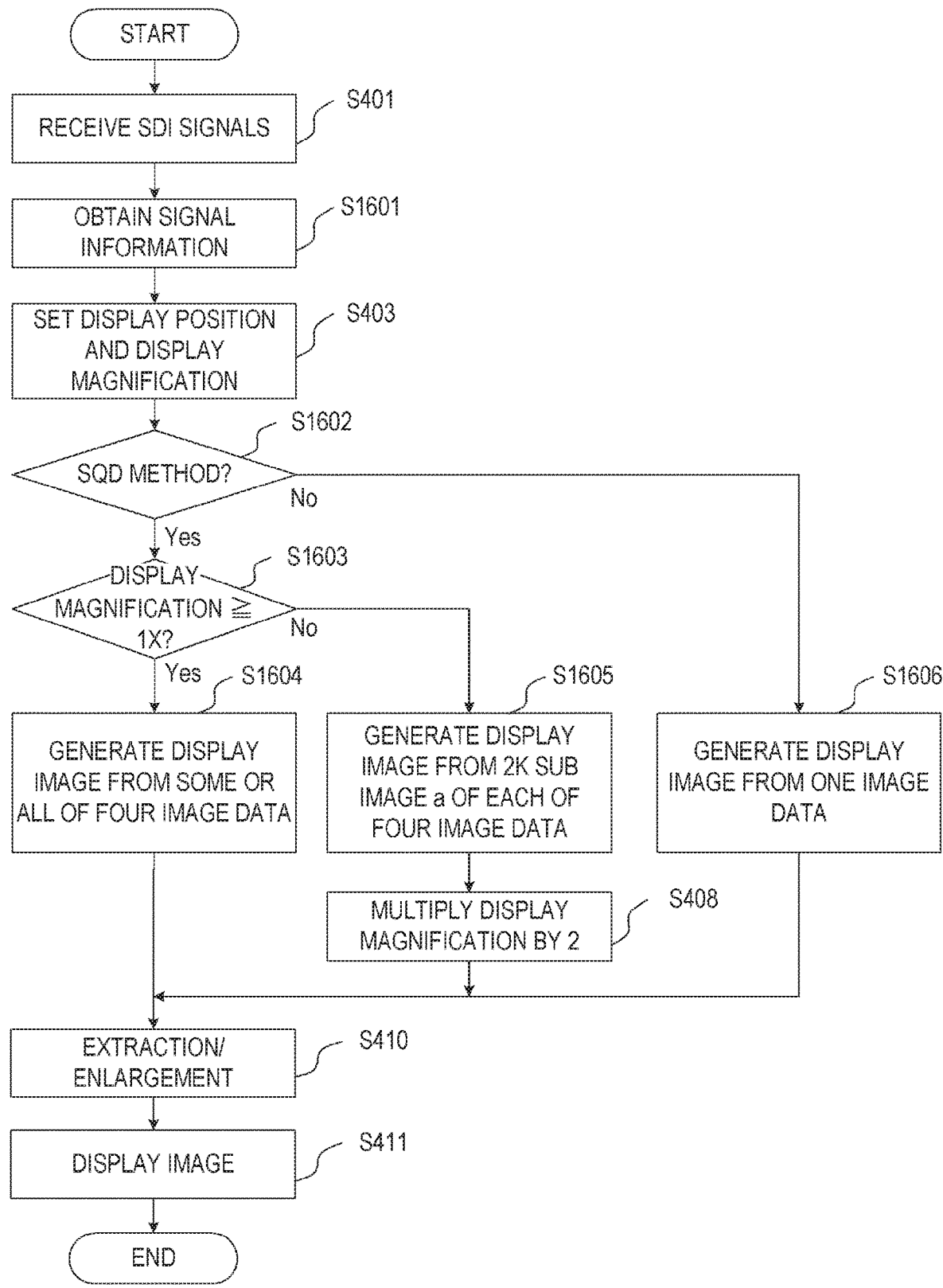
FIG. 16 is a flowchart for illustrating exemplary processing in the display apparatus according to the fifth embodiment.

FIG. 16 is a flowchart for illustrating processing by the display apparatus 1400 according to the embodiment. The reception of SDI signals (S401) is performed similarly to the first embodiment.

In S1601, the signal information obtaining unit 1402 obtains signal information from received SDI signals. Then, similarly to the first embodiment, a display position and a display magnification are set in response to user operation (S403).

In S1602, the image generating unit 1404 determines whether the dividing method for the 8K image input to the display apparatus 1400 is based on SQD on the basis of the signal information obtained by the signal information obtaining unit 1402. When the method is the SQD method (Yes in S1602), the process proceeds to S1603 and otherwise (No in S1602) to S1606.

In S1603, the image generating unit 1404 determines whether the display magnification is at least 1× (a threshold T3). When the display magnification is at least 1× (Yes in S1603), the process proceeds to S1604 and otherwise (No in S1603) to S1605.

In S1604, the image generating unit 1404 selects four terminals, extracts pixels included in some or all of image data a to d, and generates a display image.

In S1605, the image generating unit 1404 selects four terminals and extracts pixels included in a 2K sub image from each of the image data a to d to generate a display image (a 4K image).

In S1606, the image generating unit 1404 selects one terminal, and generates a display image using one of the image data a to d. The processing in S408, S410, and S411 is the same as that of the first embodiment, and their description will not be provided.

As in the foregoing, according to the embodiment, in the entire image display, four terminals are selected and one 2K sub image is extracted from each of the image data a to d, and a display image is generated. In the equal magnification display and the double enlargement display, four terminals are selected and a region included in some or all of the four image data a to d are extracted and a 4K image is generated. In this way, when an 8K image divided according to the SQD method is input to the display apparatus, a degradation in the picture quality can be reduced in the equal magnification display and the double enlargement display.

Note that when the 8K image is divided by a method other than the SQD method, a display image is generated on the basis of image data transmitted through one terminal, while when the dividing method is not the SQD method, the same processing as that in the first or second embodiment may be performed.

Modifications

In the above-description of the embodiments, the threshold T1 is the ratio between an image size (4K) which can be generated by the image generating unit and the screen resolution by way of illustration, while the value of the threshold T1 is not particularly limited. For example, the threshold T1 may be the ratio (0.5) between the resolution (8K) of the original image and the screen resolution. In this case, when the display magnification is less than 0.5×, a display image is generated using the image data a similarly to the above-described embodiments. When the display magnification is greater than the threshold T1 (0.5) and smaller than the display magnification in the equal magnification display (1×), a display image is generated using the image data a to d. At the time, pixels for a size corresponding to the size of a display image (such as ¼ times the size of the display image) are sampled from each of the image data a to d, and a 4K display image is generated. In this way, a degradation in the image to be displayed at the display unit can be reduced when the display magnification is 0.5 to 1. Note that when the display magnification is greater than the display magnification in the equal magnification display (1×), the display image is generated similarly to the embodiments described above.

In the above-description of the embodiments, a 8K image is input to a 4K display apparatus by way of illustration, while the image to be input and the screen resolution of the display apparatus are not particularly limited. When for example the standard of an input signal is Quad-Link 3G-SDI, the processing carried out for displaying an input 4K image at a 2K display apparatus may be applied.

In the above-description of the embodiments, processing is carried out using a single display apparatus, while an electronic apparatus discrete from the display apparatus may be used to perform the processing.

In the above-description of the embodiments, four terminals are used as inputs to the display apparatus, while the number of input terminals is not particularly limited. Alternatively, images (including moving images) may be obtained for example by wireless communication without using terminals (cables).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-203839, filed on Oct. 30, 2018, which is hereby incorporated by reference herein in its entirety.

What is claimed is:

1. An electronic apparatus which generates a display image, comprising:
   terminals; and
   at least one processor and/or at least one circuit to perform the operations of:
   obtaining second images each having a second number of pixels from the terminals, wherein the second images are obtained by sampling a first image per prescribed number of pixels and form the first image having a first number of pixels,
   setting a region of the first image corresponding to the display image based on user input;
   generating the display image on the basis of one of the second images in a case where the number of pixels in the region is greater than a threshold, and
   generating the display image using at least two of the second images in a case where the number of pixels in the region is smaller than the threshold.

2. The electronic apparatus according to claim 1, wherein in the setting, a position of the region of the first image is set based on the user input.

3. The electronic apparatus according to claim 1, wherein in the setting, a display magnification for displaying the region of the first image from the user input is obtained and the region on the basis of the display magnification is set.

4. The electronic apparatus according to claim 1, wherein the threshold is a value corresponding to the ratio between the number of pixels in an image which can be generated and the number of pixels in an image which can be displayed by display unit.

5. The electronic apparatus according to claim 1, wherein the terminals are four terminals.

6. The electronic apparatus according to claim 1,
   wherein the first image is an 8K image including 7680 pixels in the horizontal direction and 4320 pixels in the vertical direction, and
   wherein the second image is a 4K image including 3840 pixels in the horizontal direction and 2160 pixels in the vertical direction.

7. The electronic apparatus according to claim 1, further comprising:

obtaining signal information including a method for dividing the first image or a standard of a reception signal.

8. The electronic apparatus according to claim 7, wherein the signal information includes information indicating that the dividing method is a 2SI (2 Sample Interleave) method.

9. The electronic apparatus according to claim 1, further comprising:

a display configured to display an image on the basis of the display image.

10. A control method for an electronic apparatus which generates a display image wherein the electronic apparatus including terminals, the control method comprising:

obtaining second images each having a second number of pixels from the terminals, wherein the second images are obtained by sampling a first image per prescribed number of pixels and form the first image having a first number of pixels, setting a region of the first image corresponding to the display image based on user input, and generating the display image on the basis of one of the second images in a case where the number of pixels in the region is greater than a threshold, and generating the display image using at least two of the second images in a case where the number of pixels in the region is smaller than the threshold.

11. A non-transitory computer readable medium that stores a program, wherein the program causes a computer to execute: a control method for an electronic apparatus which generates a display image wherein the electronic apparatus including terminals, the control method comprising:

obtaining second images each having a second number of pixels from the terminals, wherein the second images are obtained by sampling a first image per prescribed number of pixels and form the first image having a first number of pixels, setting a region of the first image corresponding to the display image based on user input, generating the display image on the basis of one of the second images in a case where the number of pixels in the region is greater than a threshold, and generating the display image using at least two of the second images in a case where the number of pixels in the region is smaller than the threshold.

12. An electronic apparatus which generates a display image, comprising:

terminals; and at least one processor and/or at least one circuit to perform the operations of:

obtaining second images each having a second number of pixels from the terminals, wherein the second images are obtained by dividing a first image having a first number of pixels, setting a region of the first image corresponding to the display image based on user input, and generating the display image on the basis of one of the second images in a case where the number of pixels in the region is greater than a threshold, wherein in the generating, (1) generating third images obtained by sampling each of the second images per prescribed number of pixels, and (2) generating the display image using the third images, in a case where the number of pixels in the region is greater than the number of pixels in the second image, and (3) generating the display image using at least one of the second images, in a case where the number of pixels in the region is smaller than the number of pixels in the second image.

13. A control method for an electronic apparatus which generates a display image wherein the electronic apparatus including terminals, the control method comprising:

obtaining second images each having a second number of pixels from the terminals, wherein the second images are images obtained by dividing a first image having a first number of pixels, setting a region of the first image corresponding to the display image based on user input, and generating the display image on the basis of one of the second images in a case where the number of pixels in the region is greater than a threshold, wherein in the generating, (1) generating third images obtained by sampling each of the second images per prescribed number of pixels, and (2) generating the display image using the third images, in a case where the number of pixels in the region is greater than the number of pixels in the second image, and (3) generating the display image using at least one of the second images, in a case where the number of pixels in the region is smaller than the number of pixels in the second image.

14. A non-transitory computer readable medium that stores a program, wherein the program causes a computer to execute: a control method for an electronic apparatus which generates a display image wherein the electronic apparatus including terminals, the control method comprising:

obtaining second images each having a second number of pixels from the terminals, wherein the second images are images obtained by dividing a first image having a first number of pixels, setting a region of the first image corresponding to the display image based on user input, and generating the display image on the basis of one of the second images in a case where the number of pixels in the region is greater than a threshold, wherein in the generating, (1) generating third images obtained by sampling each of the second images per prescribed number of pixels, and (2) generating the display image using the third images, in a case where the number of pixels in the region is greater than the number of pixels in the second image, and (3) generating the display image using at least one of the second images, in a case where the number of pixels in the region is smaller than the number of pixels in the second image.

* * * * *